US007460200B2

(12) United States Patent
Kitson et al.

(10) Patent No.: US 7,460,200 B2
(45) Date of Patent: Dec. 2, 2008

(54) LIQUID CRYSTAL ALIGNMENT

(75) Inventors: Stephen Christopher Kitson, Bristol (GB); Adrian Derek Geisow, Bristol (GB)

(73) Assignee: Helwett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 11/133,672

(22) Filed: May 20, 2005

(65) Prior Publication Data

US 2005/0270461 A1    Dec. 8, 2005

Related U.S. Application Data

(60) Continuation-in-part of application No. 10/899,818, filed on Jul. 27, 2004, and a continuation-in-part of application No. 10/152,099, filed on May 21, 2002, now Pat. No. 6,992,741, and a continuation-in-part of application No. 09/816,942, filed on Mar. 23, 2001, now Pat. No. 6,903,790, which is a division of application No. 09/815,999, filed on Mar. 23, 2001, now Pat. No. 6,798,481, and a continuation-in-part of application No. 09/816,941, filed on Mar. 23, 2001.

(30) Foreign Application Priority Data

Mar. 27, 2000    (EP)    .................................. 00302478

(51) Int. Cl.
*G02F 1/1337*    (2006.01)
(52) U.S. Cl. ...................................... 349/129; 349/130
(58) Field of Classification Search ................. 349/129, 349/123, 125, 128, 130, 136
See application file for complete search history.

(56) References Cited

U.S. PATENT DOCUMENTS

| | | | | |
|---|---|---|---|---|
| 4,232,947 A | 11/1980 | Funada et al. | ................ | 349/123 |
| 4,294,782 A | 10/1981 | Froehlig | .................... | 264/1.38 |
| 4,333,708 A | 6/1982 | Boyd et al. | .................. | 349/129 |
| 4,758,296 A | 7/1988 | McGrew | ..................... | 156/231 |
| 4,893,907 A | 1/1990 | Mallinson | ................... | 349/171 |

(Continued)

FOREIGN PATENT DOCUMENTS

EP    0 768 560    4/1997

(Continued)

OTHER PUBLICATIONS

"Pretilt angle control of liquid-crystal alignment by using projections on substrate surfaces for dual-domain TN-LCD" T. Yamamoto et al, J. SID, 4/2, 1996.

(Continued)

*Primary Examiner*—Thoi V Duong

(57) ABSTRACT

A liquid crystal device comprises a first cell wall and a second cell wall enclosing a layer of liquid crystal material. The device has electrodes for applying an electric field across at least some of the liquid crystal material, and a surface alignment structure on a region of a substantially planar inner surface of at least the first cell wall. The alignment structure induces the liquid crystal material to adopt a desired alignment in an azimuthal plane. The surface alignment structure comprises a two dimensional array of microstructures which are shaped and oriented to produce the desired alignment. Each microstructure has no plane of symmetry orthogonal to the azimuthal plane and to said planar inner surface.

28 Claims, 17 Drawing Sheets

U.S. PATENT DOCUMENTS

| | | | |
|---|---|---|---|
| 4,906,315 A | 3/1990 | McGrew | 156/231 |
| 5,109,293 A | 4/1992 | Matsunaga et al. | 349/189 |
| 5,327,271 A | 7/1994 | Takeuchi et al. | 349/88 |
| 5,552,611 A | 9/1996 | Enichen | 250/491.1 |
| 5,574,593 A | 11/1996 | Wakita et al. | 359/259 |
| 5,751,382 A | 5/1998 | Yamada et al. | 349/12 |
| 5,754,264 A | 5/1998 | Bryan-Brown et al. | 349/123 |
| 5,872,611 A | 2/1999 | Hirata et al. | 349/147 |
| 5,917,570 A | 6/1999 | Bryan-Brown et al. | 349/129 |
| 6,067,141 A | 5/2000 | Yamada et al. | 349/129 |
| 6,236,445 B1 | 5/2001 | Foschaar et al. | 349/156 |
| 6,266,122 B1 | 7/2001 | Kishimoto et al. | 349/156 |
| 6,327,016 B1 | 12/2001 | Yamada et al. | 349/129 |
| 6,456,348 B2 | 9/2002 | Bryan-Brown et al. | 349/129 |
| 6,519,018 B1 | 2/2003 | Samant et al. | 349/130 |
| 6,549,256 B1 | 4/2003 | Bryan-Brown et al. | 349/128 |
| 6,671,059 B2 | 12/2003 | Frisa et al. | 356/630 |
| 6,714,273 B2 | 3/2004 | Bryan-Brown et al. | 349/129 |
| 7,053,975 B2 * | 5/2006 | Wood et al. | 349/177 |
| 2005/0062919 A1 | 3/2005 | Bryan-Brown et al. | 349/123 |

FOREIGN PATENT DOCUMENTS

| | | |
|---|---|---|
| EP | 1 094 103 | 4/2001 |
| GB | 2 286 467 | 8/1995 |
| GB | 2 290 629 | 1/1996 |
| JP | 56-138712 | 10/1981 |
| JP | 2-211422 | 8/1990 |
| JP | 5-53513 | 3/1993 |
| JP | 5-88177 | 4/1993 |
| JP | 5-249463 | 9/1993 |
| JP | 10-148827 | 6/1998 |
| JP | 11-311789 | 11/1999 |
| JP | 2000-206535 | 7/2000 |
| WO | WO 91/11747 | 8/1991 |
| WO | WO 92/00546 | 2/1992 |
| WO | WO 96/24880 | 8/1996 |
| WO | WO 97/14990 | 4/1997 |
| WO | WO 99/34251 | 7/1999 |
| WO | WO 01/40853 | 6/2001 |

OTHER PUBLICATIONS

"Alignment of Nematic Crystals and Their Mixtures", J. Cognard, Mol. Cryst. Liq. Cryst. 1-78 (1982) Supplement 1.

"The Alignment of Liquid Crystals by Grooved Surfaces" D.W. Berreman, Mol. Cryst. Liq. Cryst. 23 215-231 1973.

"The liquid crystal alignment properties of photolithographic gratings", J. Cheng and G. D. Boyd, *Appl. Phys. Lett.* 35(6) Sep. 15, 1979.

G P Bryan-Brown, E L Wood and I C Sage, *Nature* vol. 399 p. 338 1999.

"Unconventional Methods for Fabricating and Patterning Nanostructures", Youan Xia et al, Chem. Rev. 1999, 99, 1823-1848.

"Soft Lithography", Youan Xia and George M. Whitesides, *Agnew. Chem. Int. Ed.* 1998, 37, 550-575.

Robert N. Thurston et al, "Mechanically Bistable Liquid Crystal Display Structures", IEEE Trans. Electronic Devices, pp. 2069-2080, 1980.

\* cited by examiner

LIQUID CRYSTAL ALIGNMENT

CROSS-REFERENCE TO RELATED APPLICATIONS

The present application is:
(a) a continuation-in-part of U.S. patent application Ser. No. 09/816,942, filed Mar. 23, 2001 now U.S. Pat. No. 6,903,790;
(b) a continuation-in-part of U.S. patent application Ser. No. 10/899,818, filed Jul. 27, 2004, which is a divisional of U.S. patent application Ser. No. 09/815,999, filed Mar. 23, 2001, now U.S. Pat. No. 6,798,481;
(c) a continuation-in-part of U.S. patent application Ser. No. 09/816,941, filed Mar. 23, 2001; and
(d) a continuation-in-part of U.S. patent application Ser. No. 10/152,099, filed May 21, 2002 now U.S. Pat. No. 6,992,741.

All of the foregoing patent applications are incorporated herein by reference in their entirety.

FIELD OF THE INVENTION

The present invention relates to alignment of liquid crystals in liquid crystal devices.

BACKGROUND OF THE INVENTION

Liquid crystal (LC) materials are rod-like or lath-like molecules which have different optical properties along their long and short axes. The molecules exhibit some long range order so that locally they tend to adopt similar orientations to their neighbours. The local orientation of the long axes of the molecules is referred to as the "director". There are three types of LC materials: nematic, cholesteric (chiral nematic), and smectic. For a liquid crystal to be used in a display device, it must typically be made to align in a defined manner in the "off" state and in a different defined manner in the "on" state, so that the display has different optical properties in each state. Two principal alignments are homeotropic (where the director is substantially perpendicular to the plane of the cell walls) and planar (where the director is inclined substantially parallel to the plane of the cell walls). In practice, planar alignments may be tilted with respect to the plane of a cell wall, and this tilt can be useful in aiding switching. The present invention is concerned with alignment in liquid crystal displays.

Hybrid Aligned Nematic (HAN), Vertical Aligned Nematic (VAN), Twisted nematic (TN) and super-twisted nematic (STN) cells are widely used as display devices in consumer and other products. The cells comprise a pair of opposed, spaced-apart cell walls with nematic liquid crystal material between them. The walls have transparent electrode patterns that define pixels between them.

In TN and STN displays, the inner surface of each wall is treated to produce a planar unidirectional alignment of the nematic director, with the alignment directions being at 90° to each other. This arrangement causes the nematic director to describe a quarter helix within the TN cell, so that polarised light is guided through 90° when a pixel is in the "field off" state. In an STN cell, the nematic liquid crystal is doped with a chiral additive to produce a helix of shorter pitch which rotates the plane of polarisation in the "field off" state. The "field off" state may be either white or black, depending on whether the cell is viewed through crossed or parallel polarisers. Applying a voltage across a pixel causes the nematic director to align normal to the walls in a homeotropic orientation, so that the plane of polarised light is not rotated in the "field on" state.

In a HAN cell, one wall is treated to align a nematic LC in a homeotropic alignment and the other wall is treated to induce a planar alignment, typically with some tilt to facilitate switching. The LC has positive dielectric anisotropy, and application of an electric field causes the LC directors to align normal to the walls so that the cell switches from a birefringent "field off" state to a non-birefringent "field on" state.

In the VAN mode, a nematic LC of negative dielectric anisotropy is homeotropically aligned in the "field off" state, and becomes birefringent in the "field on" state.

Liquid crystal (LC) planar alignment is typically effected by the unidirectional rubbing of a thin polyimide alignment layer on the interior of the LC cell, which gives rise to a unidirectional alignment with a small pretilt angle. It has been proposed to increase the pretilt angle for a rubbed surface by incorporating small projections in the rubbed alignment layer, in "Pretilt angle control of liquid-crystal alignment by using projections on substrate surfaces for dual-domain TN-LCD" T. Yamamoto et al, J. SID, 4/2, 1996.

Whilst having a desirable effect on the optical characteristics of the device, the rubbing process is not ideal as this requires many process steps, and high tolerance control of the rubbing parameters is needed to give uniform display substrates. Moreover, rubbing may cause static and mechanical damage of active matrix elements which sit under the alignment layer. Rubbing also produces dust, which is detrimental to display manufacture.

Photoalignment techniques have recently been introduced whereby exposure of certain polymer coating to polarised UV light can induce planar alignment. This avoids some of the problems with rubbing, but the coatings are sensitive to LC materials, and typically produce only low pre-tilt angles.

An alternative is to use patterned oblique evaporation of silicon oxide (SiO) to form the alignment layer. This also effects a desired optical response; however the process is complicated by the addition of vacuum deposition and a lithography process. Moreover, control of process parameters for SiO evaporation is critical to give uniformity, which is typically difficult to achieve over large areas.

A useful summary of methods of aligning liquid crystals is given in "Alignment of Nematic Liquid Crystals and Their Mixtures", J. Cognard, Mol. Cryst. Liq. Cryst. 1-78 (1982) Supplement 1.

The use of surface microstructures to align LCs has been known for many years, for example as described in "The Alignment of Liquid Crystals by Grooved Surfaces" D. W. Berriman, Mol. Cryst. Liq. Cryst. 23 215-231 1973.

It is believed that the mechanism of planar alignment involves the LC molecules aligning along the grooves to minimise distortion energy derived from deforming the LC material. Such grooves may be provided by a monograting formed in a photoresist or other suitable material.

It has been proposed in GB 2 286 467 to provide a sinusoidal bigrating on at least one cell wall, by exposing a photopolymer to an interference pattern of light generated by a laser. The bigrating permits the LC molecules to lie in two different planar angular directions, for example 45° or 90° apart. An asymmetric bigrating structure can cause tilt in one or both angular directions. Other examples of alignment by gratings are described in WO 96/24880, WO 97/14990 WO 99/34251, and "The liquid crystal alignment properties of photolithographic gratings", J. Cheng and G. D. Boyd, *Appl. Phys. Lett.* 35(6) 15 Sep. 1979. In "Mechanically Bistable Liquid-Crystal Display Structures", R. N. Thurston et al, IEEE trans. on Electron Devices, Vol. ED-27 No 11, November 1980, LC planar alignment by a periodic array of square structures is theorised.

LC homeotropic alignment is also a difficult process to control, typically using a chemical treatment of the surface, such as lecithin or a chrome complex. These chemical treatments may not be stable over time, and may not adhere very uniformly to the surface to be treated. Homeotropic alignment has been achieved by the use of special polyimide resins (Japan Synthetic Rubber Co). These polyimides need high temperature curing which may not be desirable for low glass transition plastic substrates. Inorganic oxide layers may induce homeotropic alignment if deposited at suitable angles. This requires vacuum processes which are subject to the problems discussed above in relation to planar alignment. Another possibility for producing homeotropic alignment is to use a low surface energy material such as PTFE. However, PTFE gives only weak control of alignment angle and may be difficult to process.

It is desirable to have a more controllable and manufacturable alignment for LC devices.

SUMMARY OF THE INVENTION

We have surprisingly found that the orientation of the director is induced principally by the geometry of surface features in an array, rather than by the array or lattice itself. This is counter to what has been assumed so far in this field.

Accordingly, a first aspect of the present invention provides a liquid crystal device comprising a first cell wall and a second cell wall enclosing a layer of liquid crystal material;

electrodes for applying an electric field across at least some of the liquid crystal material; and a surface alignment structure on a region of a substantially planar inner surface of at least the first cell wall, the alignment structure inducing the liquid crystal material in said region to adopt a desired alignment in an azimuthal plane, wherein said surface alignment structure comprises a two dimensional array of microstructures which are shaped and oriented to produce the desired alignment, each microstructure extending to a distance of at least about 150 nm normal to said planar inner surface and having no plane of symmetry orthogonal to said azimuthal plane and to said planar inner surface; but not including any device in which the surface alignment structure comprises a sinusoidal bigrating.

The microstructures are posts which project from an inner surface of the first cell wall, or blind holes which are formed in a layer of material on the first cell wall. The microstructures may have walls which extend orthogonally to the planar inner surface, or which are tilted with respect to the planar inner surface. Tilting helps to remove degenerate alignment states, but we have found that this effect can also be achieved by forming non-tilted or orthogonal microstructures of suitable cross sectional shape. Thus the vertical distance from the planar inner surface along which a microstructure extends may be the length of the walls defining the microstructure, or the microstructure may be longer than the vertical height by being tilted with respect to the planar inner surface.

In a preferred embodiment, the cross sectional shape of the microstructures in a plane parallel to the planar inner surface has no rotational symmetry. It will be understood that the term "no rotational symmetry" is used herein to mean that the shape is changed when it is turned less than 360° about a fixed point.

The term "azimuthal direction" is used herein as follows. Let the walls of a cell lie in the x,y plane, so that the normal to the cell walls is the z axis. Two tilt angles in the same azimuthal direction means two different director orientations in the same x,z plane, where x is taken as the projection of the director onto the x,y plane. That projection is the "azimuthal direction" of the LC alignment. The term "azimuthal plane" is used herein to refer to a plane which includes the azimuthal direction and is orthogonal to the plane of the surface of the first cell wall. The term "tilt angle" is used herein to refer to the angle between the director and the plane of the cell wall. The term "tilt angle polarity" is used herein as follows. Within a given azimuthal plane, an LC director which is tilted with respect to the plane of the first cell wall will have a point of intersection with the plane of a surface of the first cell wall. From that point of intersection, the director can project away from the first cell wall with one of two tilt polarities. For example, for an azimuthal plane along the x axis, with the director intersecting the plane of the cell wall at x=0, the director can project away from the cell wall in the direction +x or −x, corresponding to the two tilt polarities. Tilt angle polarity may be determined by measuring the angle $\alpha$ between the azimuthal direction of the LC alignment and the director. FIG. 30 illustrates two different tilt polarities in an azimuthal plane for a given tilt angle $\alpha$. $\alpha$ is measured in (for example) the counterclockwise direction from the azimuthal direction (along the x axis) to the director 24. If $\alpha$=<90° then the tilt angle=$\alpha$ and the tilt polarity is positive. If $\alpha$>90° then the tilt angle=$\alpha$−180° and the tilt polarity is negative. It will be understood that the LC director may adopt more than one tilt angle within a single tilt polarity.

We have found that microstructures will induce both tilt polarities unless there is no plane of symmetry orthogonal to the azimuthal plane and the planar inner surface. There are several ways to achieve LC microstructural alignment having only a single tilt polarity (although possibly with different tilt angles). One way is to tilt the posts or holes to lift the degeneracy. Another way is to use posts or holes which are not tilted but which have a cross sectional shape which has no plane of symmetry orthogonal to the azimuthal plane and to the planar inner surface. There are many practical ways in which microstructures with these symmetry properties can be realised: for example a post with a teardrop-shaped cross section, or a post formed with a lump at its base, on one side, where the lump could be much shorter than the post. By using such microstructures we have found that it is possible to induce LC alignment with a single tilt angle polarity even when the microstructures have walls which extend substantially orthogonally from the plane of the cell walls. This enables a well-defined tilted alignment to be induced by non-tilted posts or holes. Such microstructures are easier to fabricate over large areas than tilted microstructures.

Other aspects of the invention provide a cell wall for use in manufacturing the device, methods of manufacturing the cell wall, and a method of manufacturing the device.

Each microstructure is preferably a discrete structure, but neighbouring microstructures could be connected together by webs of material at their bases as a results of their manufacturing process.

A post or hole deforms an LC director. That deformation propagates through the cell to define an overall alignment. When each microstructure in the cell has the same size, shape and orientation, that alignment will be in one discrete azimuthal direction. There will be a single tilt polarity, although more than one tilt angle may be possible. Where different regions of the cell have microstructures of different shape, size or orientation, the alignment direction and/or tilt polarity may vary from one region to another.

The azimuthal alignment direction is determined by the shape of the microstructure. For a square microstructure there are two such directions, along the two diagonals. For a triangular cross-section there are three directions. For other shapes there may be more than three. If there is more than one stable azimuthal direction then one or more of them can be favoured by tilting of the microstructure, or by suitable adjustment of the shape to remove reflection symmetry in a plane orthogonal to the azimuthal plane and to the planar inner surface. For an equilateral triangular post there are three director alignments possible which are equal energy, each of which is parallel to a line which bisects the triangle into equal halves. By elongating the triangle, one director orientation may be favoured, which will define the azimuthal direction. For example, an isosceles triangle will favour a director alignment along the major axis of the triangle, which will define the azimuthal plane. Depending on the height of the posts, the LC adopts a tilted alignment with a single tilt polarity. If the inner surface of the second cell wall is treated to give local homeotropic alignment, application of an electric field will cause LC molecules of positive dielectric anisotropy to line up with the field in a homeotropic orientation. The cell therefore functions in a HAN mode. By providing a different planar alignment on the second cell wall, which could also be posts, other display modes could also be used, for example TN or (with a chirally doped LC material) STN mode.

Similar considerations apply for both posts and holes. For convenience, the invention will be further described herein with reference to alignment by posts.

In a preferred embodiment, the cross sectional shape has one axis substantially longer than the others, which will typically determine the azimuthal direction of the local LC alignment.

In addition to the azimuthal direction the posts can induce well defined tilt angles. A short post will tend to induce an alignment closer to a planar alignment. We find that taller posts tend to induce higher tilt angles and in the limit result in substantially homeotropic alignment. The tilt angle can be tuned by suitably adjusting the post shape or size, or the orientation of at least one of the post walls.

For intermediate post heights we have found that there are two stable alignments which differ in their tilt angle but have the same azimuthal alignment direction. We refer to this as the "Post Aligned Bistable Nematic" (PABN) mode. Similar alignment by holes is referred to as "Hole Aligned Bistable Nematic" (HABN) mode.

By providing a plurality of upstanding tall or thin posts on at least the first cell wall, the liquid crystal molecules can be induced to adopt a state in which the director is substantially parallel to the plane of the local surface of the posts, and normal to the plane of the cell walls. The more closely packed the posts, the more the alignment will tend to be normal to the plane of the cell walls.

By providing posts of suitable dimensions and spacing, a wide range of alignment directions, from tilted planar to tilted homeotropic, can easily be achieved, and various aspects of the invention may therefore be used in desired LC display modes.

The preferred height for the posts will depend on factors such as the desired alignment and the cell gap. A typical height range is around 0.5 to 5 µm, notably 1.0 to 1.2 µm for bistable alignments (assuming a 3 µm cell gap) and taller for tilted homeotropic and homeotropic alignments.

Because the local director orientation is determined by the geometry of the posts, the array need not be a regular array. In a preferred embodiment, the posts are arranged in a random or pseudorandom array instead of in a regular lattice. This arrangement has the benefit of eliminating diffraction colours which may result from the use of regular structures. Such an array can act as a diffuser, which may remove the need for an external diffuser in some displays. Of course, if a diffraction colour is desired in the display, the array may be made regular, and the posts may be spaced at intervals which produce the desired interference effect. Thus, the structure may be separately optimised to give the required alignment and also to mitigate or enhance the optical effect that results from a textured surface.

In a preferred embodiment, the upstanding features are formed from a photoresist material or a plastics material.

The posts may be formed by any suitable means; for example by photolithography, embossing, casting, injection moulding, or transfer from a carrier layer. Embossing into a plastics material is desirable because this permits the posts to be formed simply and at low cost. Suitable plastics materials will be well known to those skilled the art, for example poly(methyl methacrylate).

The preferred height for the posts will depend on factors such as the cell thickness, the thickness and number of the posts, and the LC material. For homeotropic alignment, the posts preferably have a vertical height which is at least equal to the average post spacing. Some or all of the posts may span the entire cell, so that they also function as spacers.

It is preferred that one electrode structure (typically a transparent conductor such as indium tin oxide) is provided on the inner surface of each cell wall in known manner. For example, the first cell wall may be provided with a plurality of "row" electrodes and the second cell wall may be provided with a plurality of "column" electrodes. However, for some display modes it would also be possible to provided planar (interdigitated) electrode structures on one wall only, preferably the first cell wall. It will be understood that a microstructure may be provided wholly or partially on top of an electrode structure as well as adjacent to an electrode structures.

The cell walls are preferably spaced apart from each other by a cell gap which is less than 15 µm, notably by a gap which is less than 5 µm.

The inner surface of the second cell wall could have low surface energy so that it exhibits little or no tendency to cause any particular type of alignment, so that the alignment of the director is determined essentially by the microstructures on the first cell wall. However, it is preferred that the inner surface of the second cell wall is provided with a surface alignment to induce a desired alignment of the local director. This alignment may be homeotropic, planar or tilted. The alignment may be provided by an array of features of suitable shape and/or orientation, or by conventional means, for example rubbing, photoalignment, a monograting, or by treating the surface of the wall with an agent to induce homeotropic alignment.

The shape of the microstructures is such as to favour only one azimuthal director orientation within the region. The orientation may be the same for each region, or the orientation may vary from region to region so as to give a scattering effect in one of the two states or to improve the viewing angle. Using non-tilted posts or holes to achieve a local LC alignment with a single tilt angle polarity allows easy formation of small domains of microstructures with different azimuthal alignment directions, by changing the orientation of the microstructures from one region to another. This effect cannot be readily achieved using tilted posts because it is difficult to fabricate arrays of posts having different tilt directions in different regions by conventional photolithographic techniques.

The liquid crystal device will typically be used as a display device, and will be provided with means for distinguishing between switched and unswitched states, for example polarisers or a dichroic dye.

The cell walls may be formed from a non-flexible material such as glass, or from rigid or flexible plastics materials which will be well known to those skilled in the art of LC display manufacture, for example poly ether sulphone (PES), poly ether ether ketone (PEEK), or poly(ethylene terephthalate) (PET).

For many displays, it is desirable to have a uniform alignment throughout the field of view. For such displays, the posts may all be of substantially the same shape, size, orientation and tilt angle. However, where variation in alignment is desired these factors, or any of them, may be varied to produced desired effects. For example, the posts may have different orientations in different regions where different alignment directions are desired. A TN cell with quartered sub-pixels is an example of a display mode which requires such different orientations. If the dimensions of the posts are varied, the strengths of interactions with the LC will vary, and may provide a greyscale. Similarly, variation of the shape of the posts will vary the strength of interaction with the LC.

BRIEF DESCRIPTION OF THE DRAWINGS

The invention will now be further described by way of example, with reference to the following drawings in which.

DETAILED DESCRIPTION

Figure 2:
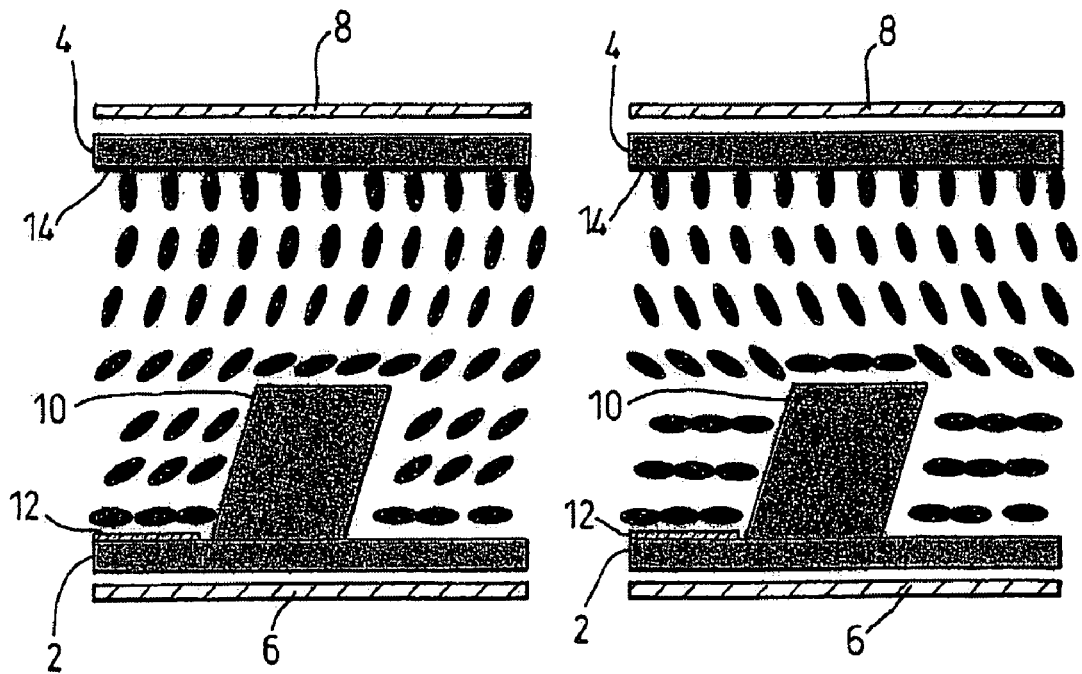
FIG. 2 shows schematic views of a cross section through a single post and the surrounding LC of a bistable nematic device in accordance with one aspect of the present invention, along one of the diagonals of a post, in different states.

The bistable nematic cell shown schematically in FIG. 2 comprises a first cell wall 2 and a second cell wall 4 which enclose a layer of nematic LC material of negative dielectric anisotropy. The cross section is in the x,y plane. The ellipses represent the LC molecules with the long axis corresponding to the local director. The inner surface of each cell wall is provided with a transparent electrode pattern, for example row electrodes 12 on the first cell wall 2 and column electrodes 14 on the second cell wall 4, in a known manner.

The inner surface of the first cell wall 2 is textured with a regular array of square posts 10, and the inner surface of the second cell wall 4 is flat. The posts 10 are approximately 1 μm high and the cell gap is typically 3 μm. The flat surface is treated to give homeotropic alignment. The posts are not homeotropically treated. The surface of each post, if provided on a flat plane, would not tend to induce strong alignment in an adjacent LC material. The alignment local to the surface would tend to be generally planar, but without a unique orientation direction. By forming alignment posts 10, however, the shape and orientation of the posts can provide a single desired LC alignment.

Figure 1:
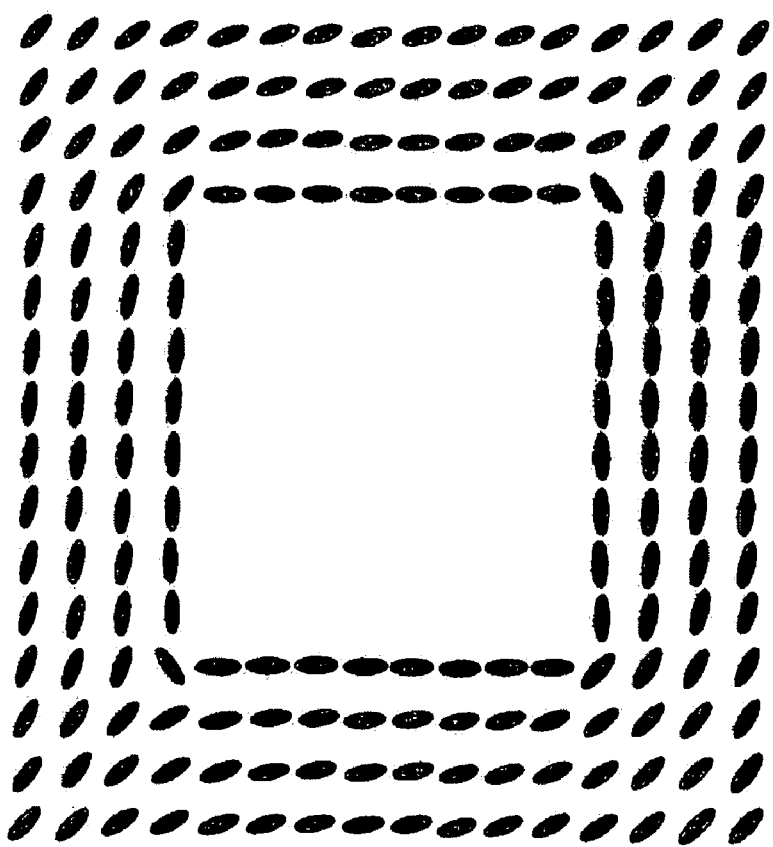
FIG. 1 is a schematic cross section through a single post and the surrounding LC in accordance with the present invention.

Such an array of square posts has two preferred alignment directions in the azimuthal plane. These are along the two diagonals of the post. FIG. 1 shows a cross-section through a post with the LC distorted around it, from one corner to the diagonally opposite one. This alignment around the post then tends to seed the alignment of the LC above the post such that the average orientation is also along that diagonal.

By shaping the posts appropriately, or by tilting the posts along one of the diagonals (FIG. 2) it is possible to favour that alignment direction. Through computer simulation of this geometry we found that although there is only one azimuthal alignment direction there may in fact be two states with similar energies but which differ in how much the LC tilts. FIG. 2 is a schematic of the two states. In one state (shown on the left of FIG. 2) the LC is highly tilted, and in the other it is planar around the posts. The exact nature of the LC orientation depends on the details of the structure, but for a range of parameters there are two distinct states with different magnitudes of tilt away from the cell wall. The two states may be distinguished by viewing through a polariser 8 and an analyser 6. The low tilt state has high birefringence and the high tilt state has low birefringence. Inclining the posts sufficiently along the diagonal also serves to eliminate reverse tilt states, ie to favour a single tilt angle polarity. Preferably the posts are tilted by at least 5°, depending on the nature of the LC and the cell gap.

Without limiting the scope of the invention in any way, we think that the two states may arise because of the way in which the LC is deformed by the post. Flowing around a post causes regions of high energy density at the leading and trailing edges of the post where there is a sharp change in direction. This can be seen in FIG. 1 at the bottom left and top right corners of the post. This energy density is reduced if the LC molecules are tilted because there is a less severe direction change. This is clear in the limit of the molecules being homeotropic throughout the cell. In that case there is no region of high distortion at the post edges. In the higher tilt state this deformation energy is therefore reduced, but at the expense of a higher bend/splay deformation energy at the base of the posts. The LC in contact with the flat surface between posts is untilted but undergoes a sharp change of direction as it adopts the tilt around the post.

In the low tilt state the energy is balanced in the opposite sense, with the high deformation around the leading and trailing edges of the post being partially balanced by the lack of the bend/splay deformation at the base of the post because the tilt is uniform around the post. Our computer simulations suggest that, for the current configuration, the higher tilt state is the lower energy state.

This is supported by observations of actual cells. When viewed at an appropriate angle between crossed polarisers the cells always cool into the darker of the two states. The state adopted on cooling from the isotropic state is expected to be the lowest energy state. From FIG. 2 it would appear that the high tilt state will have lower birefringence and therefore appear darker than the low tilt state. The exact amount of tilt in the high tilt state will be a function of the elastic constants of the LC material and the planar anchoring energy of the post material.

Figure 3:
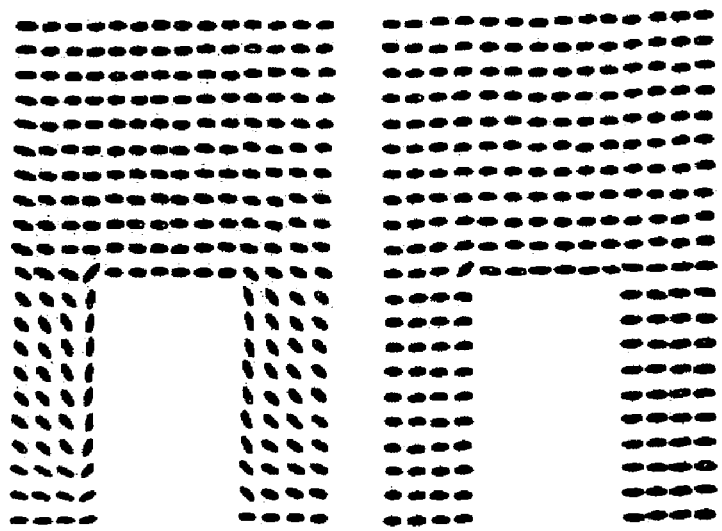
FIG. 3 shows schematic views of a cross section through a single post and the surrounding LC of a bistable nematic device in accordance with another aspect of the present invention, along one of the diagonals of a post, in different states.

Referring now to FIG. 3, there is shown a computer-generated model of LC alignment around a square post similar to that shown in FIG. 2, but with the inner surface of the second cell wall treated to give planar alignment. In the state shown in the left in FIG. 3, the local director is highly tilted, and in the other it is planar around the posts. As with the cell of FIG. 2, switching between the two states is achieved by the application of suitable electrical signals.

Figure 4:
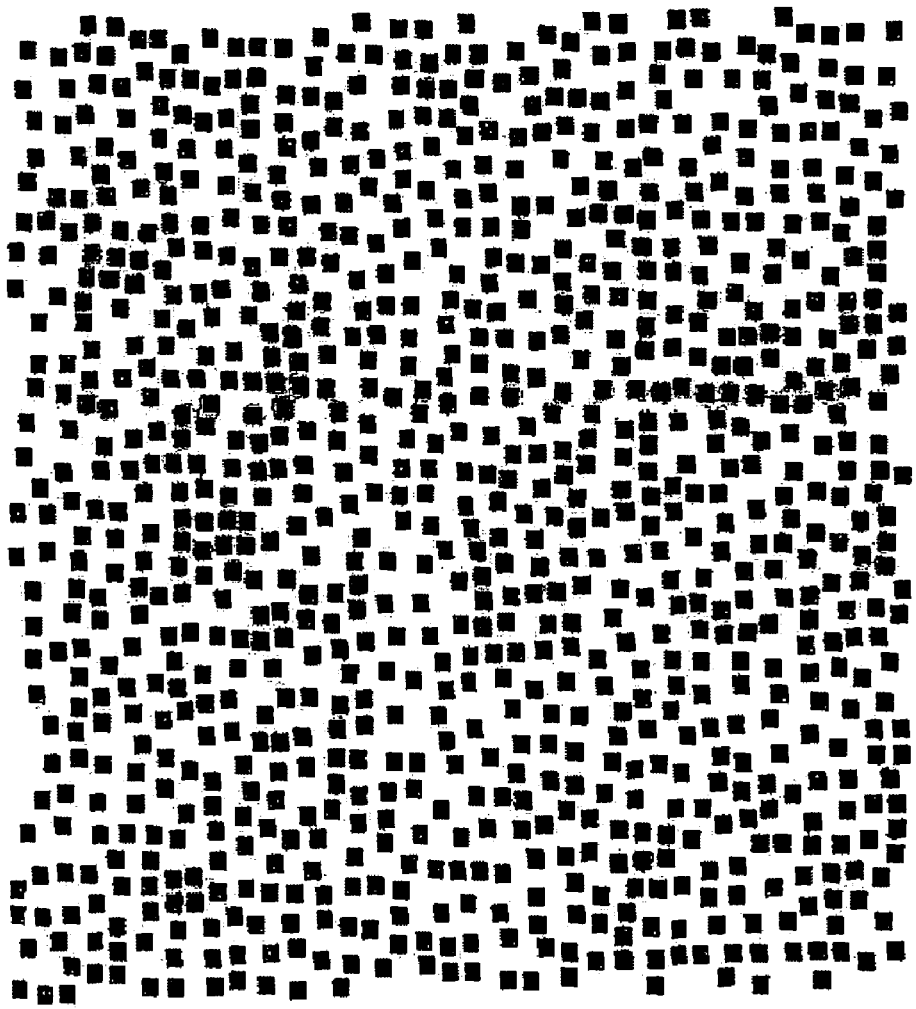
FIG. 4 is a plan view of a unit cell of a device in accordance with the present invention, having posts in a pseudorandom array.

FIG. 4 shows a pseudorandom array of posts for an alternative embodiment of the invention, which provides bistable switching without interference effects. Each square post is about 0.8×0.8 μm, and the pseudorandom array has a repeat distance of 56 μm.

Cell Manufacture

A clean glass substrate 2 coated with Indium Tin Oxide (ITO) was taken and electrode patterns 12 were formed using conventional lithographic and wet etch procedures. The substrate was spin-coated with a suitable photoresist (Shipley S1813) to a final thickness of 1.3 μm.

A photomask (Compugraphics International PLC) with an array of suitably-dimensioned square opaque regions in a square array, was brought into hard contact with the substrate and a suitable UV source was used to expose the photoresist for 10 s at ~100 mW/cm$^2$. The substrate was developed using Microposit Developer diluted 1:1 with deionised water for approximately 20 s and rinsed dry. The substrate was flood exposed using a 365 nm UV source for 3 minutes at 30 mW/cm$^2$, and hardbaked at 85° C. for 12 hours. The substrate was then deep UV cured using a 254 nm UV source at ~50 mW/cm$^2$ for 1 hour. By exposing through the mask using a UV source at an offset angle to the normal to the plane of the cell wall, tilted posts could be produced. The tilt angle (or blaze angle) is related to the offset angle by Snell's law. Exposure to the developer will also affect the shape of the posts.

A second clean ITO substrate 4 with electrode patterns 14 was taken and treated to give a homeotropic alignment of the liquid crystal using a stearyl-carboxy-chromium complex, in a known manner.

An LC test cell was formed by bringing the substrates together using suitable spacer beads (Micropearl) contained in UV curing glue (Norland Optical Adhesives N73) around the periphery of the substrates 2, 4, and cured using 365 nm UV source. The cell was capillary filled with a nematic liquid crystal mixture (Merck ZLI 4788-000). Methods of spacing, assembling and filling LC cells are well known to those skilled in the art of LCD manufacture, and such conventional methods may also be used in the spacing, assembling and filling of devices in accordance with the present invention.

Experimental Results

Figure 5:
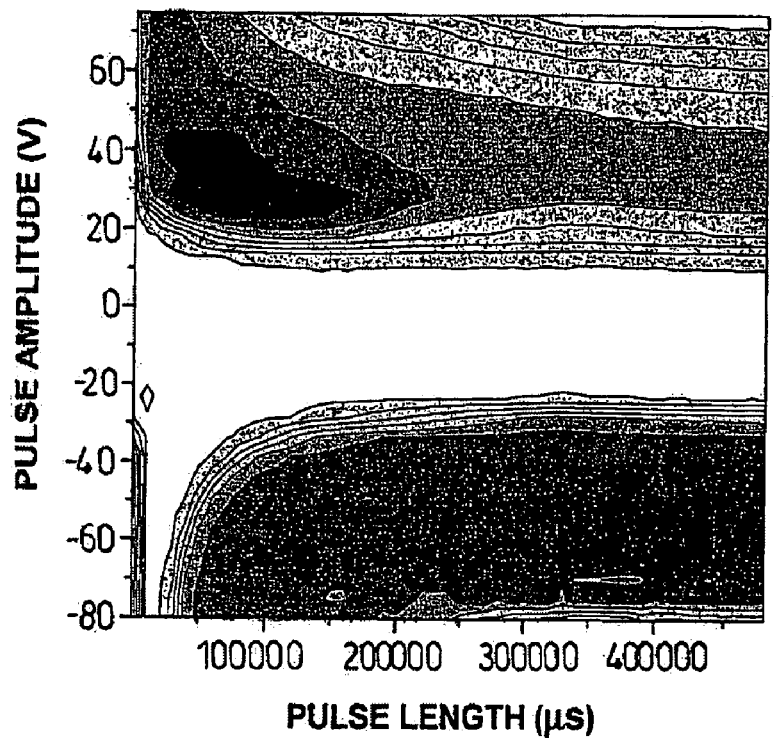
FIGS. 5 and 6 show change in transmission of an experimental cell in accordance with the invention, as a function of pulse length and amplitude, for bistable switching between two states.
Figure 6:
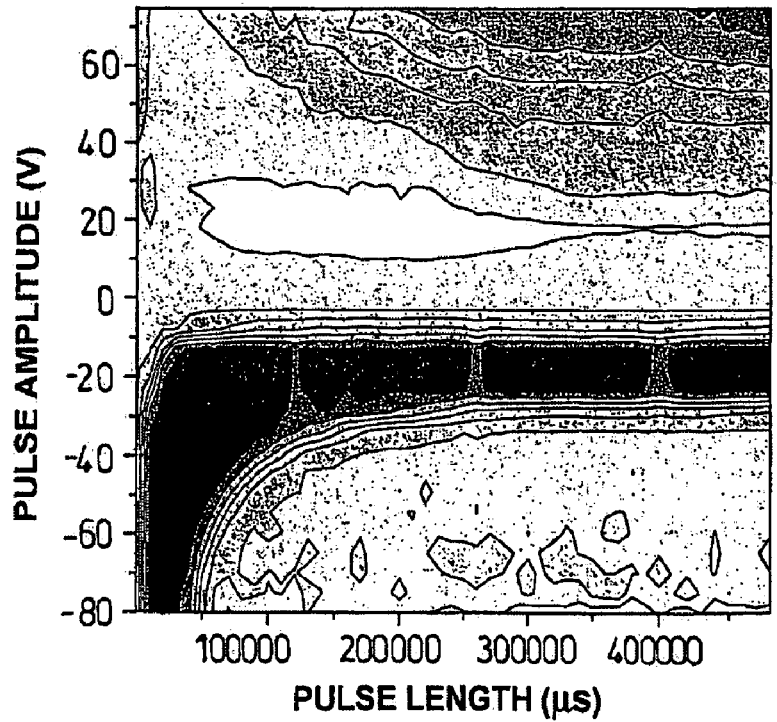

FIGS. 5 and 6 show the switching response of a bistable cell recorded at 42.5° C. The cell had the following characteristics:

spacing: 3 μm
post height: 1.4 μm
gap between posts: 0.7 μm
offset angle: 12°
LC: ZLI 4788-000 (Merck) doped with 3% N65 (Norland).

It was found that adding a small quantity of surfactant oligomer to the LC improved the switching. It is known that switching in conventional LC devices can be improved by addition of surfactant oligomers to the LC. See, for example, G P Bryan-Brown, E L Wood and I C Sage, *Nature Vol.* 399 p 338 1999. We doped the LC with N65 UV-curable glue (from Norland) and cured it while in the isotropic phase. The doped LC was then mass filtered to remove the longer chain lengths. We found that adding 3% by weight of N65 to the LC was optimum.

DC balanced monopolar pulses were applied to the cell and the effect on the transmission was recorded. Each test pulse was of an amplitude V and a duration τ, and was followed by another pulse of opposite polarity but with an amplitude about 5% of V, but a duration 20 times longer. The second pulse was too small to cause switching but did prevent a build up of charge in the cell after many test pulses. FIGS. 5 and 6 show the change in transmission as a function of the pulse length and amplitude. FIG. 5 shows results for switching from the high energy state to the low energy state, and FIG. 6 shows results for switching in the opposite direction. Black indicates that the transmission had changed so that the cell is switched. White indicates no change in transmission so that no switching has occurred.

Switching from the high energy state to the low energy state is generally sign independent indicating that in this direction switching is taking place via the dielectric anisotropy. Switching in the other direction is sign dependent indicating that the switching is mediated by a linear electro-optic effect. We believe this is likely to be the flexoelectric effect. In FIG. 5, the non-switching region coincides with the switching region in FIG. 6. This suggests that switching from the high energy state to the low energy state is impeded by the flexoelectric effect.

In a series of further experiments we have varied the cell parameters to go some way towards optimising the switching characteristics of the device. A preferred cell structure is: cell gap 3 μm; post size 1 μm; offset angle 5° along one of the diagonals of the post; 1.1 μm coating of s1813; N65 initial concentration 3%.

SEM Studies of Post Arrays

Figure 7:
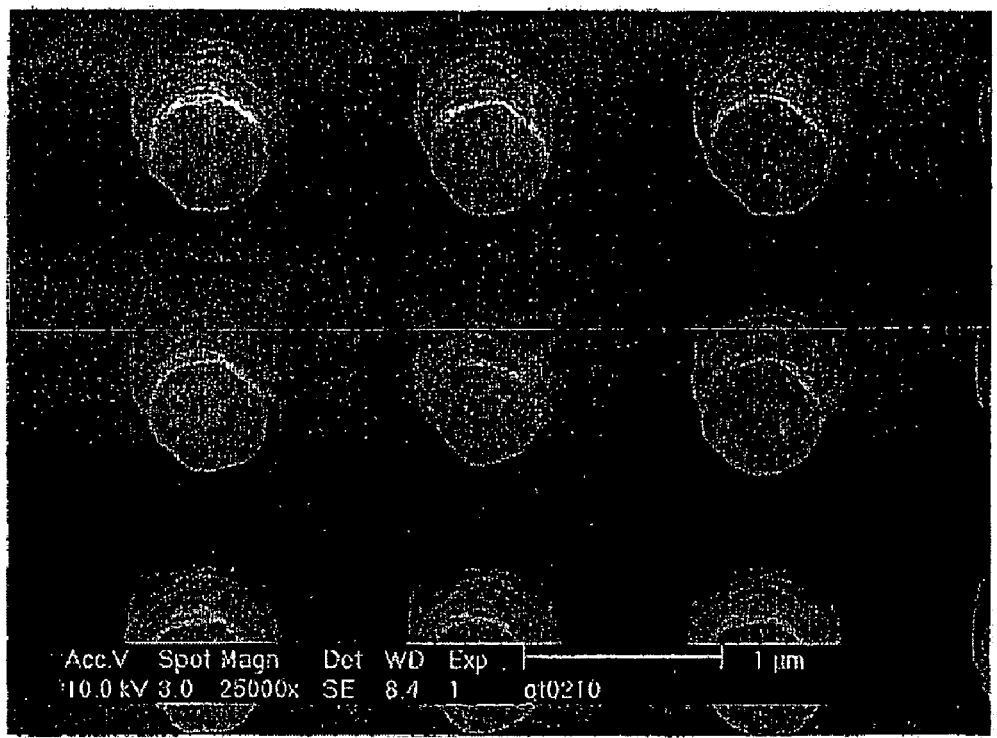
FIGS. 7 to 10 are SEM photomicrographs of arrays of posts used in the manufacture of liquid crystal devices in accordance with the invention.
Figure 8:
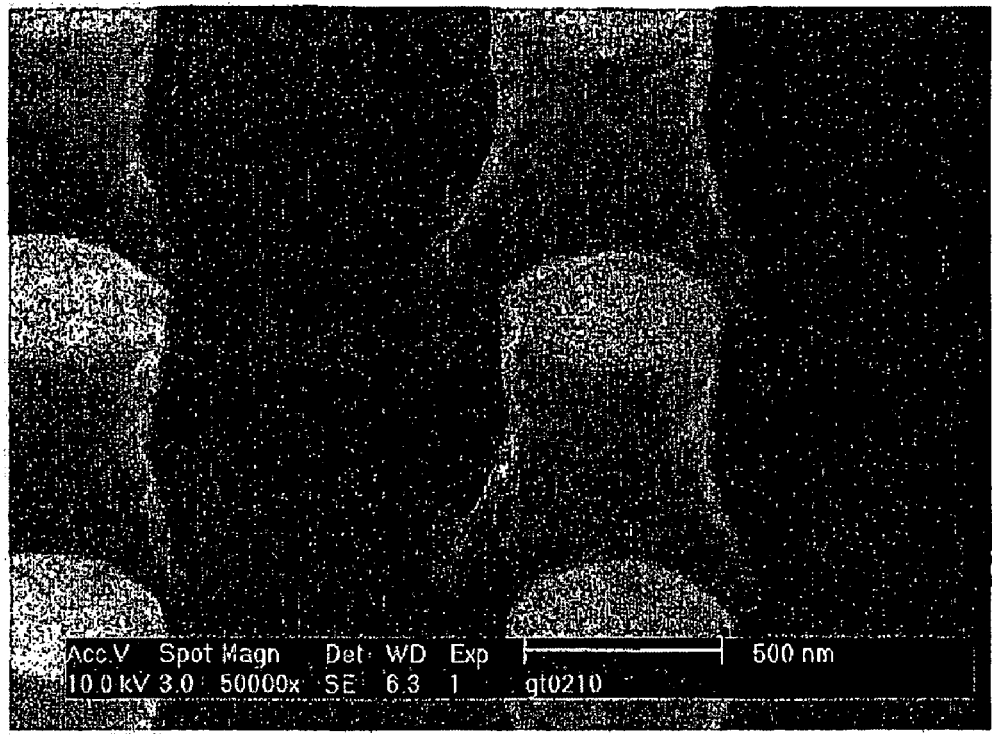
Figure 9:
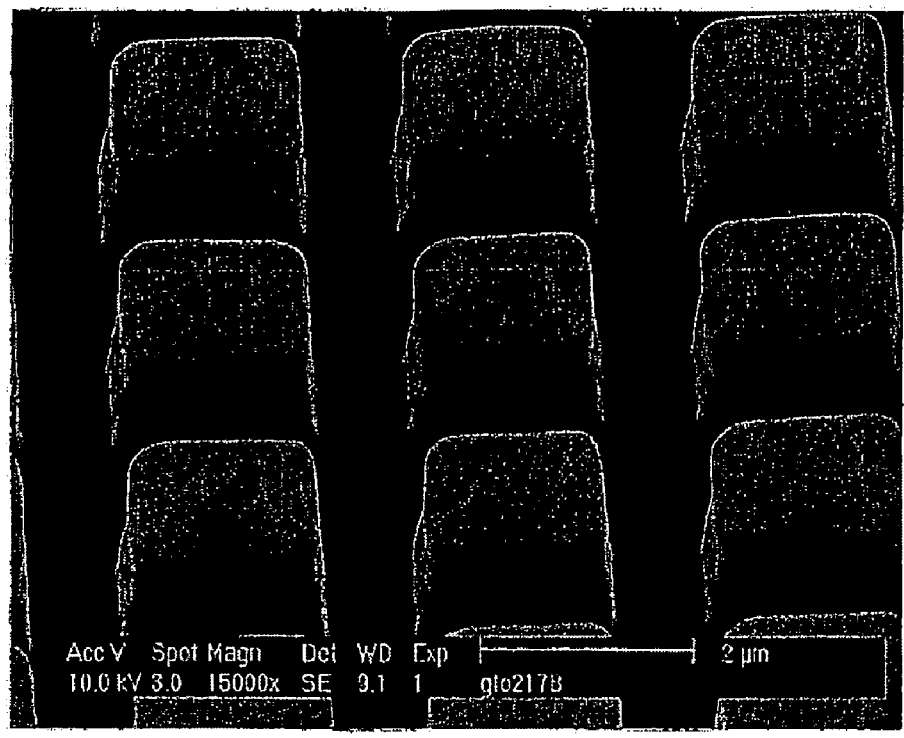
Figure 10:
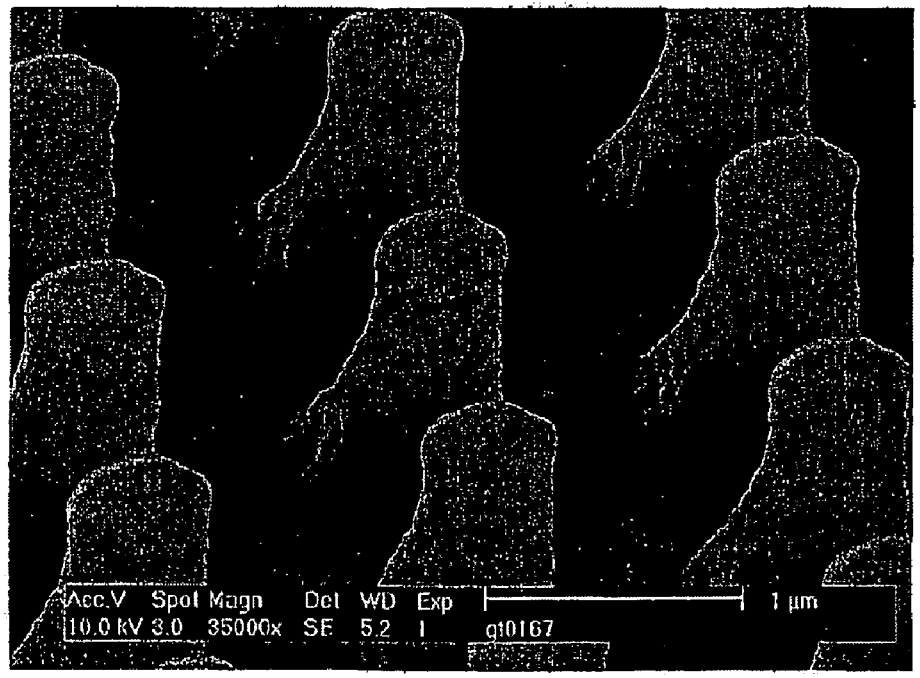

SEMs of experimental post arrays formed using masks with square opaque regions are shown in FIGS. 7 to 10. The posts in FIGS. 7 and 8 were formed using 0.7 µm square opaque regions 90% s1813, and a 5° offset angle. The 0.7 µm "square" posts are not very square, having considerably rounded tops. The bases of the posts are much less rounded than the tops of the posts. This is consistent with the rounding being due to the development process. The tops of the posts are exposed to the developer for a longer time than the bases. They are therefore more susceptible to attack. Even the unexposed resist that makes up the posts will have some finite solubility in the resist, and the effect will be to attack sharp features such as corners first. Larger posts show much less rounding off; for example FIG. 9 shows some 2 µm posts.

Computer Simulations with Rounded Posts

Figure 11:
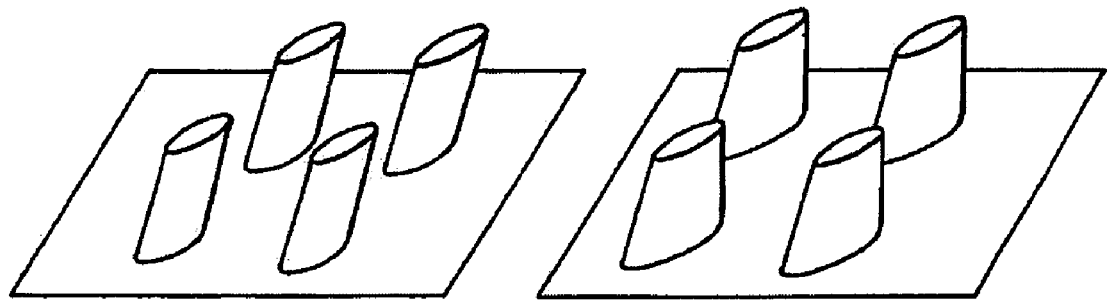
FIGS. 11 to 17 are views of different arrays of features of devices in accordance with further embodiments of the invention.
Figure 12:
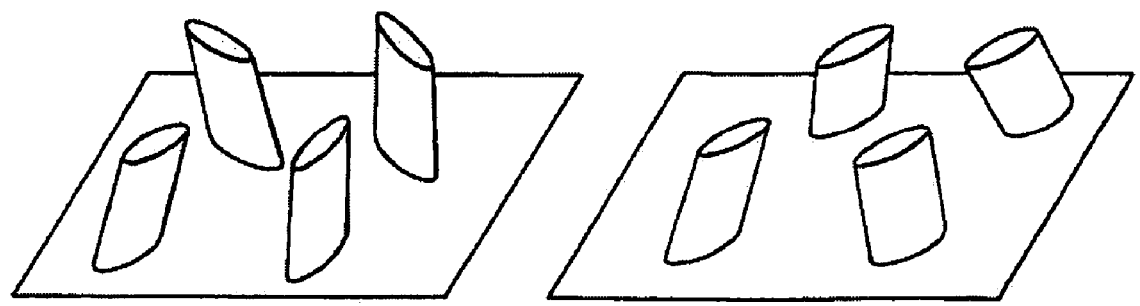

We have generated computer models that look very similar to the 0.7 µm rounded posts of FIGS. 7 and 8. Even though the posts are far from the idealised square posts that we had used in previous simulations, these more realistic posts still give the same states, aligned along the blazed diagonals, but with two different magnitudes of tilt. The energies of the two states are slightly lower than before, but the tilted state still has the lowest energy. It seems that it is not essential to have sharp edges to the posts. The two states are believed to arise because of the way that the LC is distorted around a post (as previously discussed). This will be true whatever the shape of the cross-section of the post. Even cylindrical posts should give the same two zenithal alignments. However, with cylindrical symmetry there is nothing to fix the azimuthal alignment of the LC—all directions will be degenerate. The posts need to have some asymmetry to lift this degeneracy. This could be for example an elliptical, diamond or square cross section with a small amount of blaze. Examples of elliptical posts are given in FIG. 11, those on the right hand side having an overhang. Referring now to FIG. 12, examples are shown wherein the shape and/or orientation of the posts is such as to favour only one azimuthal director orientation adjacent the posts. In the embodiment on the left side of FIG. 12, this orientation varies from post to post so as to give a scattering effect in one of the two states. In the embodiment shown on the right side of FIG. 12, the azimuthal director orientation is uniform across the display, but the tilt angle of the posts varies, which may provide a greyscale.

Figure 13:
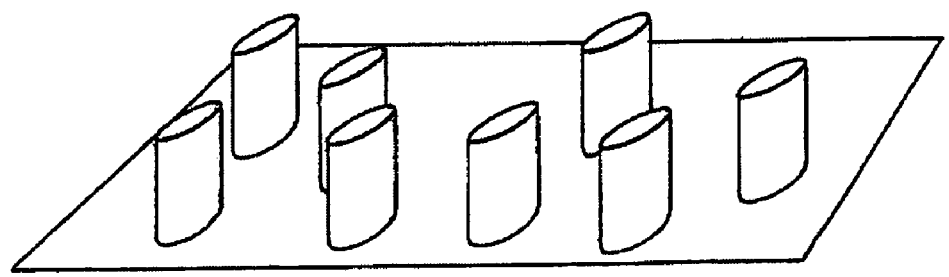
Figure 14:
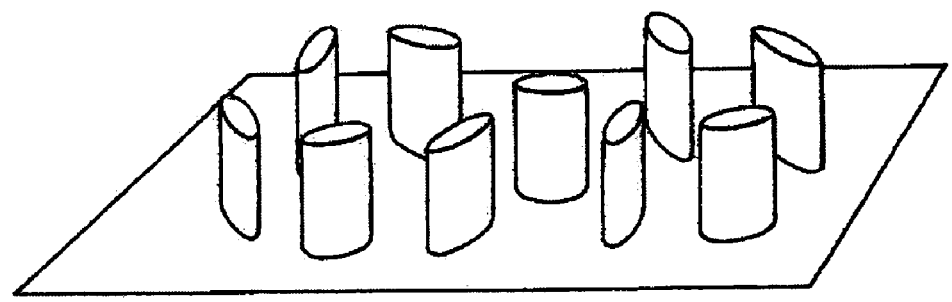
Figure 15:
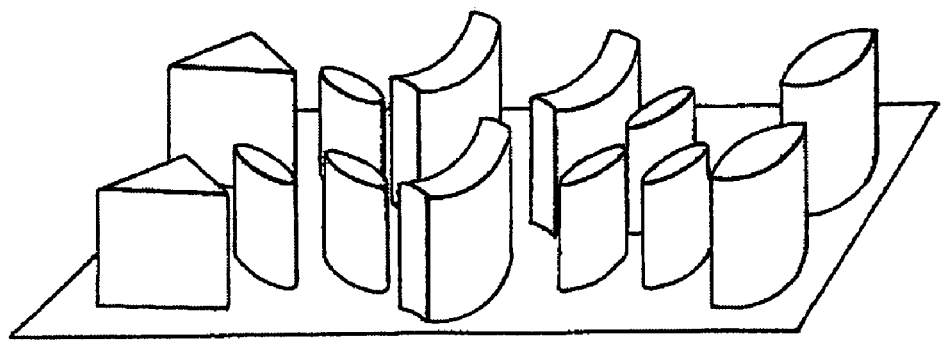
Figure 16:
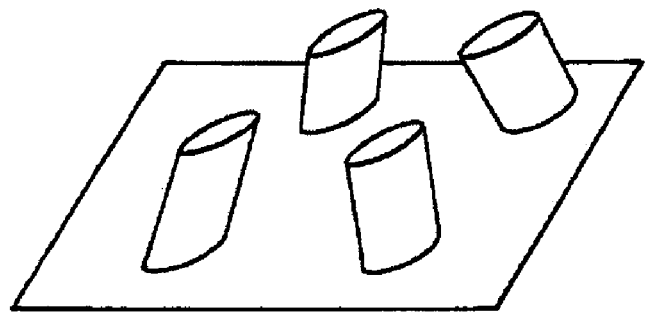
Figure 17:
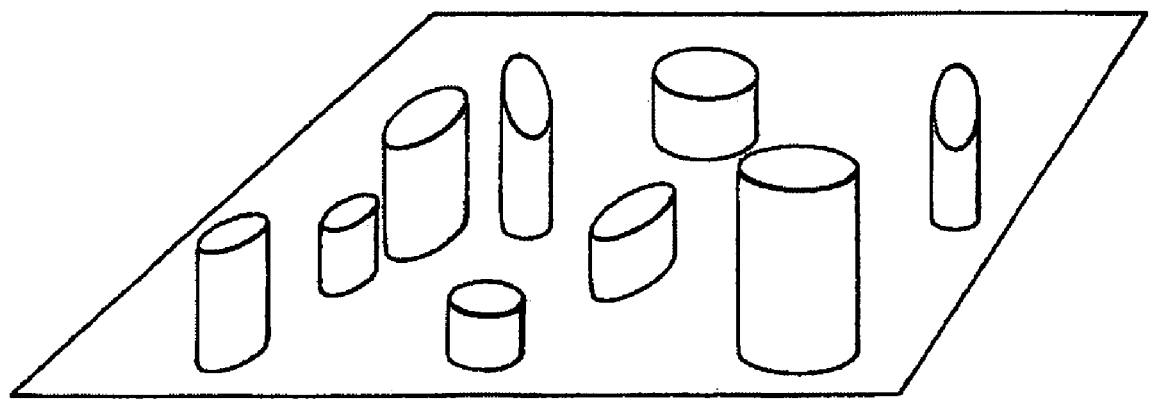

FIGS. 13 to 17 show perspective views of posts of devices in accordance with alternative embodiments of the invention. The posts are arranged in pseudorandom arrays. In FIG. 13, elliptical posts are shown, with the long axes of the ellipses parallel. Depending on their height, the posts produce either a uniform planar alignment, a bistable or multistable alignment (planar or tilted), or a homeotropic alignment (which may be tilted). In FIG. 14, elliptical posts are randomly orientated, providing an alignment structure in which there is no strongly preferred long range orientation of the nematic director. It is envisaged that this structure and others like it may be used with an LC material of positive dielectric anisotropy in a display with a scattering mode. FIG. 15 illustrates an arrangement of posts of a plurality of shapes and sizes which may be used to give controlled alignment in different areas, and different effects such as greyscale. Other arrangements and effects are of course possible. For example, the posts may be different heights in different regions, as illustrated in FIG. 17, which also shows different post sizes and orientations in a pseudorandom arrangement. In a HAN display mode, varying the post height will give a variation in the switching performance. The posts in FIG. 16 are tilted at different angles in different regions of the display, thereby producing different tilt angles in the LC alignment and the possibility of producing a greyscale, for example in a HAN mode.

Figure 18:
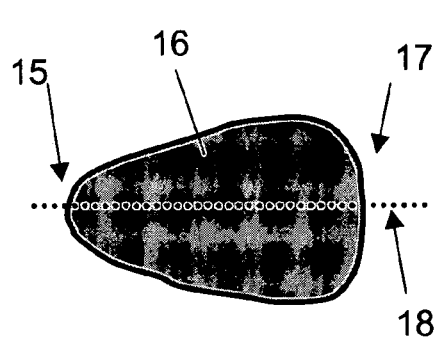
FIG. 18 is a top plan view of a teardrop-shaped post in accordance with another aspect of the present invention.
Figure 19:
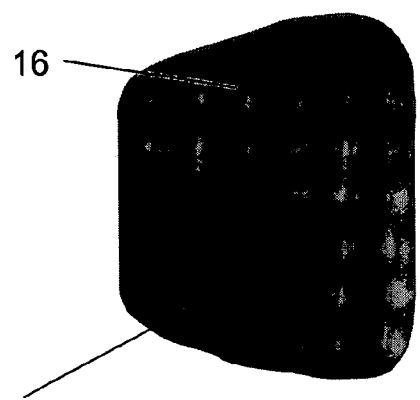
FIG. 19 is a perspective view of the post of FIG. 18.

Referring now to FIGS. 18 and 19, an alignment post 10 for use in another embodiment of the present invention is shown. The post 10 extends perpendicularly to the plane of a cell wall surface and has an elongate cross sectional shape 16 which has no rotational symmetry. The shape 16, which in this embodiment is the shape of the top and the base of the post 10, has a narrow portion 15 at one end and a broader, rounded portion 17 at an opposite end. This shape will be referred to for convenience as a teardrop shape.

The shape 16 has a unique long axis 18 about which it is substantially symmetrical (this feature being preferred but not essential) and LC alignment along which minimizes distortion. If the shape 16 had a plane of symmetry orthogonal to the long axis 18 (which here defines the azimuthal plane) and to the plane of the cell walls, such as the square posts described earlier, then either of two tilt polarities along the long axis 18 would be possible and of equal energy. To lift the degeneracy, square posts may be tilted as previously described. However, for the post of shape 16, which has no plane of symmetry orthogonal to the azimuthal plane and to the plane of the cell walls, the two tilt polarities are not of equal energy, even for a post 10 with walls perpendicular to the plane of the cell wall surface. We find that, in the vertical direction, the two different tilt polarities are geometrically and energetically distinct, giving rise to a unique tilted LC alignment.

Figure 20:
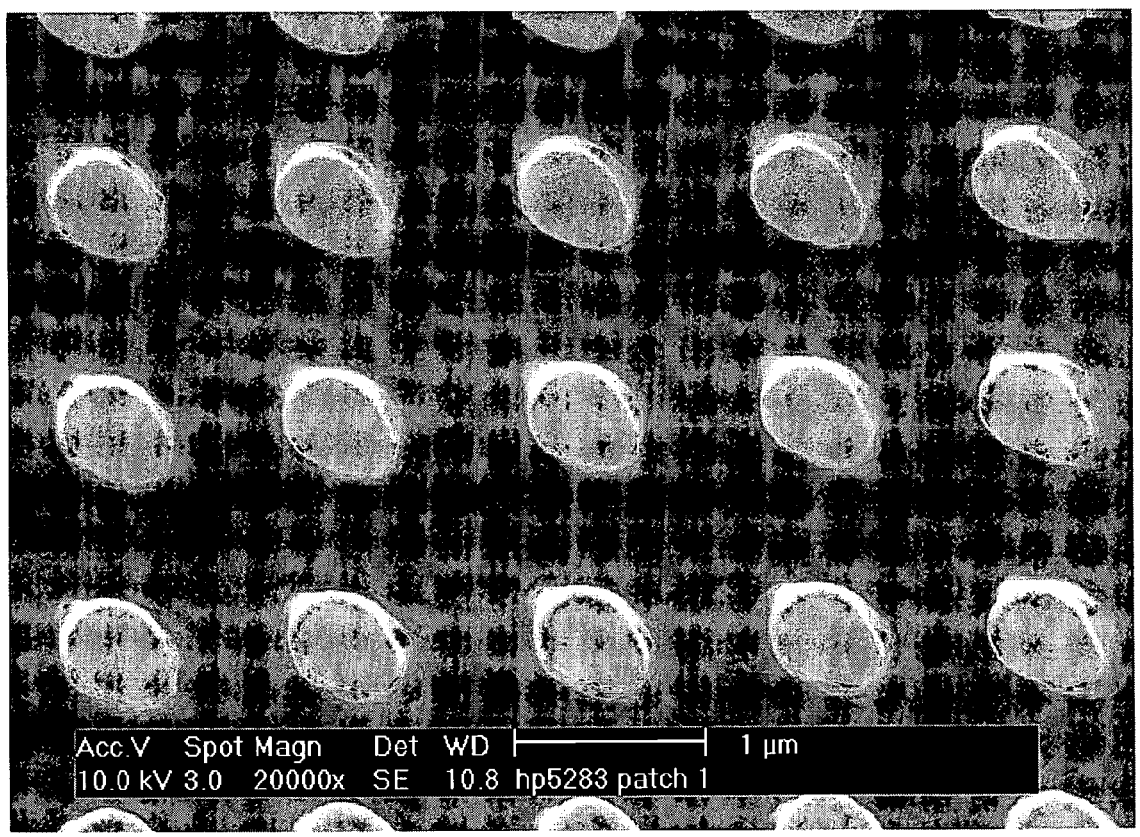
FIGS. 20 and 23 are SEM photomicrographs of arrays of posts for use in the manufacture of liquid crystal devices in accordance with an aspect of the present invention.

FIG. 20 shows some actual non-tilted posts with a teardrop cross section made by imprinting into a UV curable polymer using a master made by hard contact photolithography. To test the LC alignment we made a test device using the post structures shown in FIG. 20 on one inner surface and a homeotropic alignment material on the other inner surface. The liquid crystal mixture was as described above under Experimental Results but including 1% by weight of TMP (trimethylolpropane tris(3-mercaptopropionate)) additive instead of 3% N65.

Figure 22:
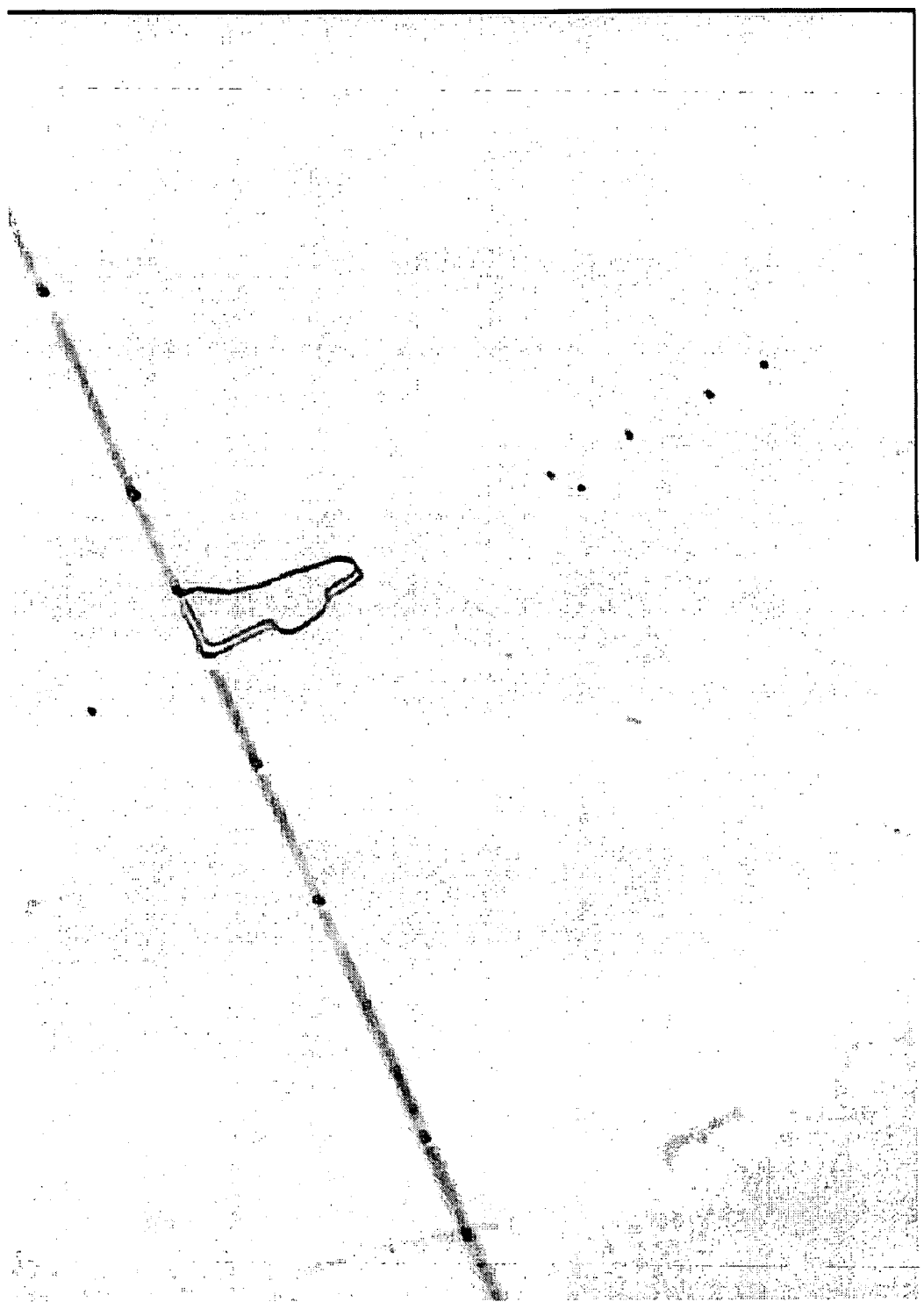
FIG. 22 is a photomicrograph from a polarizing microscope of a liquid crystal display device in accordance with an embodiment of the invention.

We found that we got good alignment as shown in FIG. 22. If the alignment were not in a unique direction then we would have obtained lots of dark domain walls similar to the one in the middle of FIG. 22. In this case the domain wall is pinned on a line defect in the array of teardrop posts.

Figure 25:
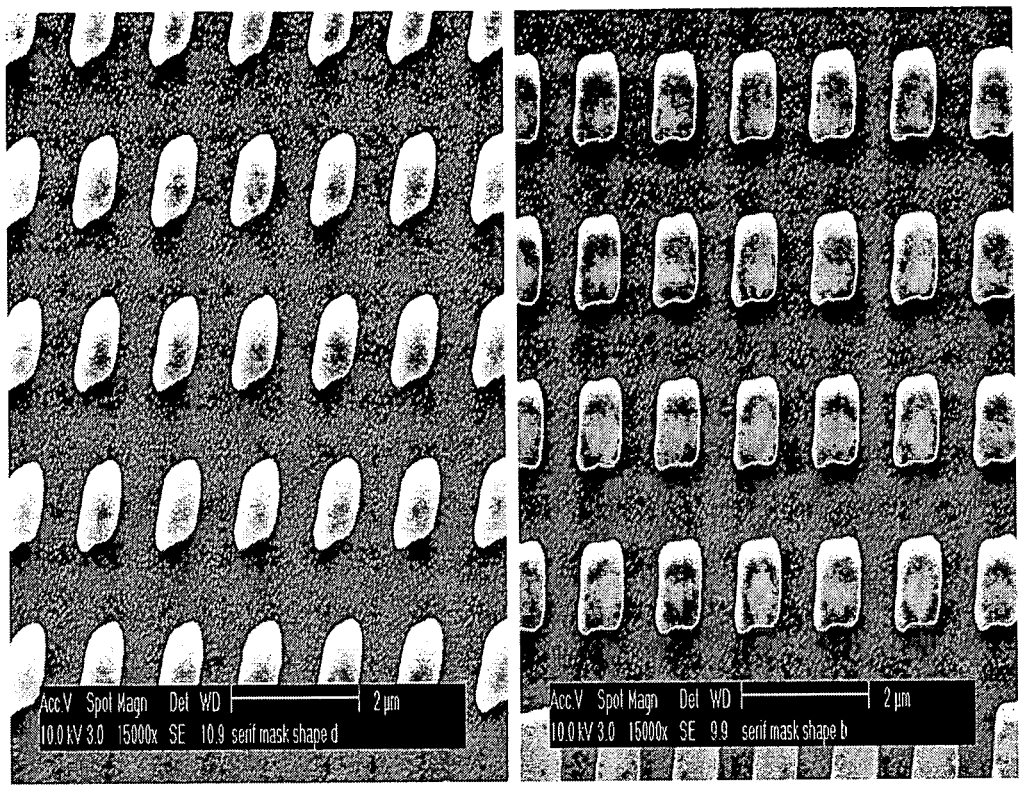
FIG. 25 shows SEM photomicrographs of masks for making alignment posts in accordance with embodiments of the invention.
Figure 25:
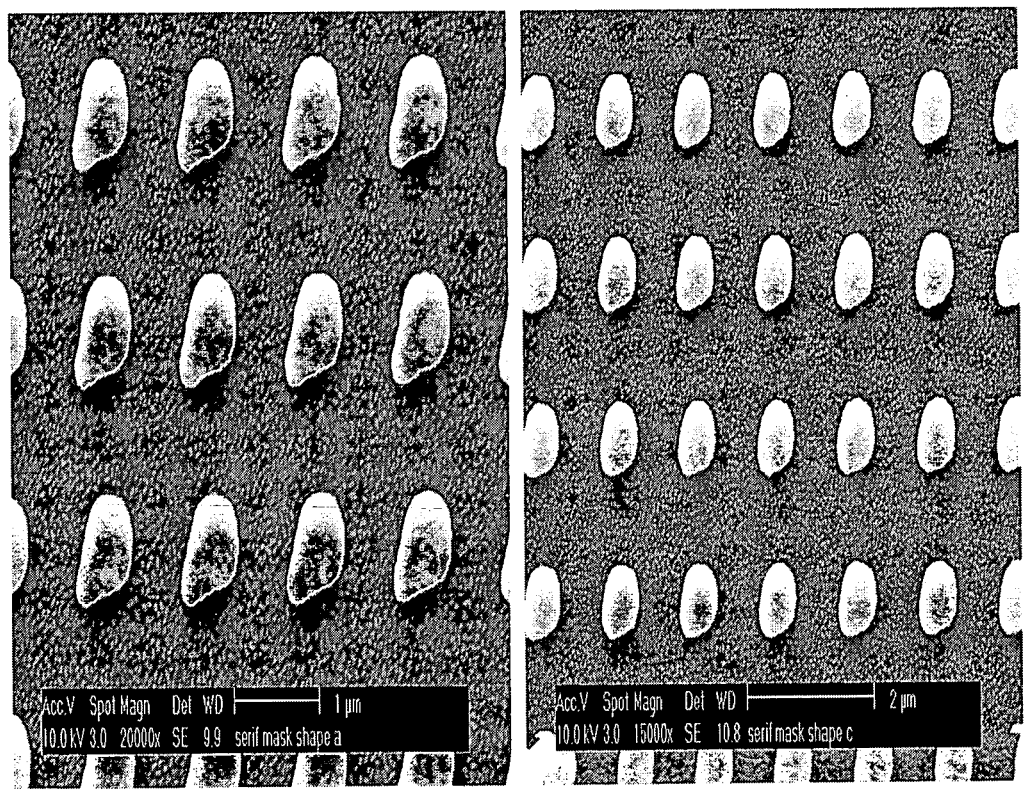
Figure 29:
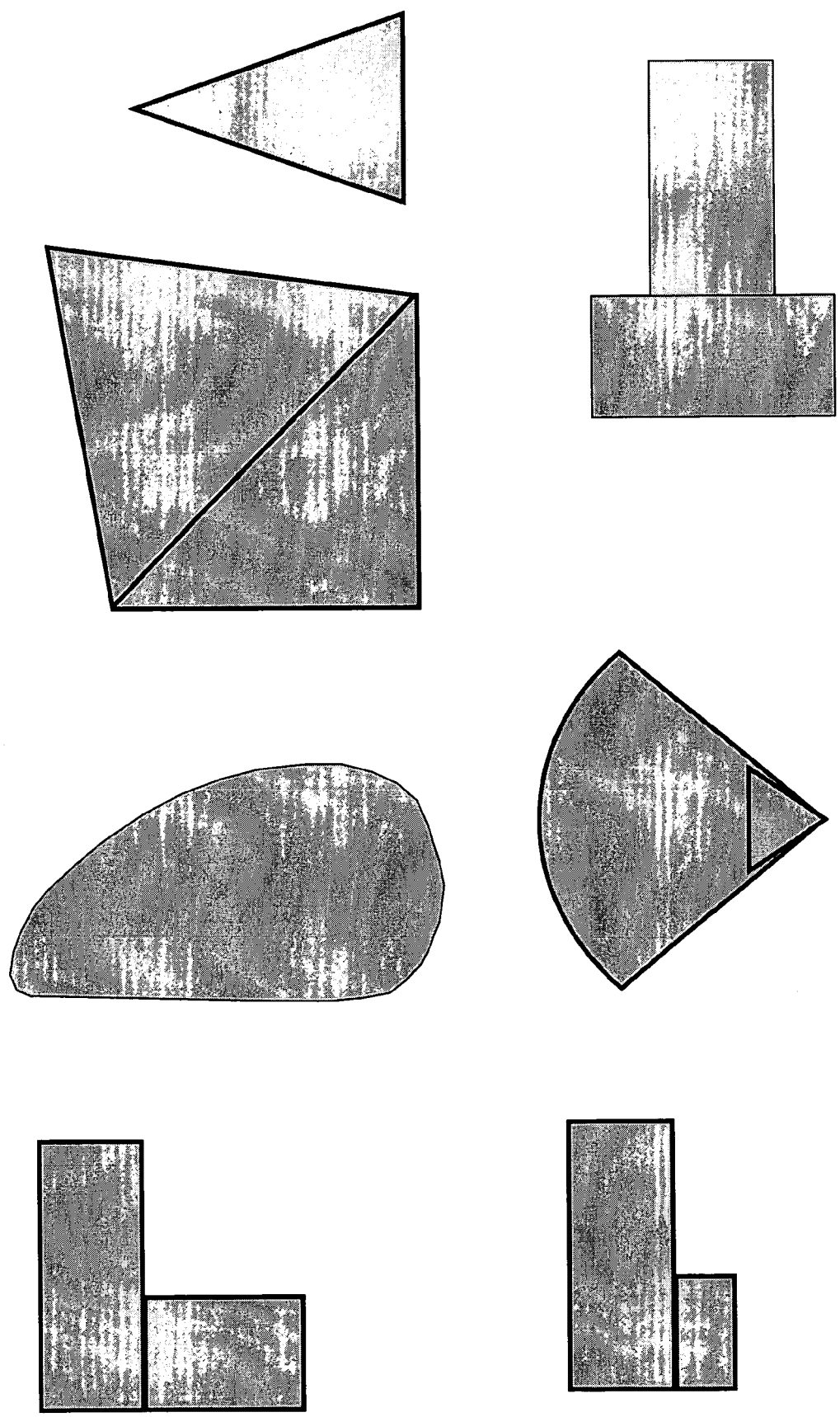
FIG. 29 shows examples of cross sectional or base shapes for a variety of alignment posts for use in liquid crystal display devices in accordance with yet further aspects of the invention.
Figure 30:
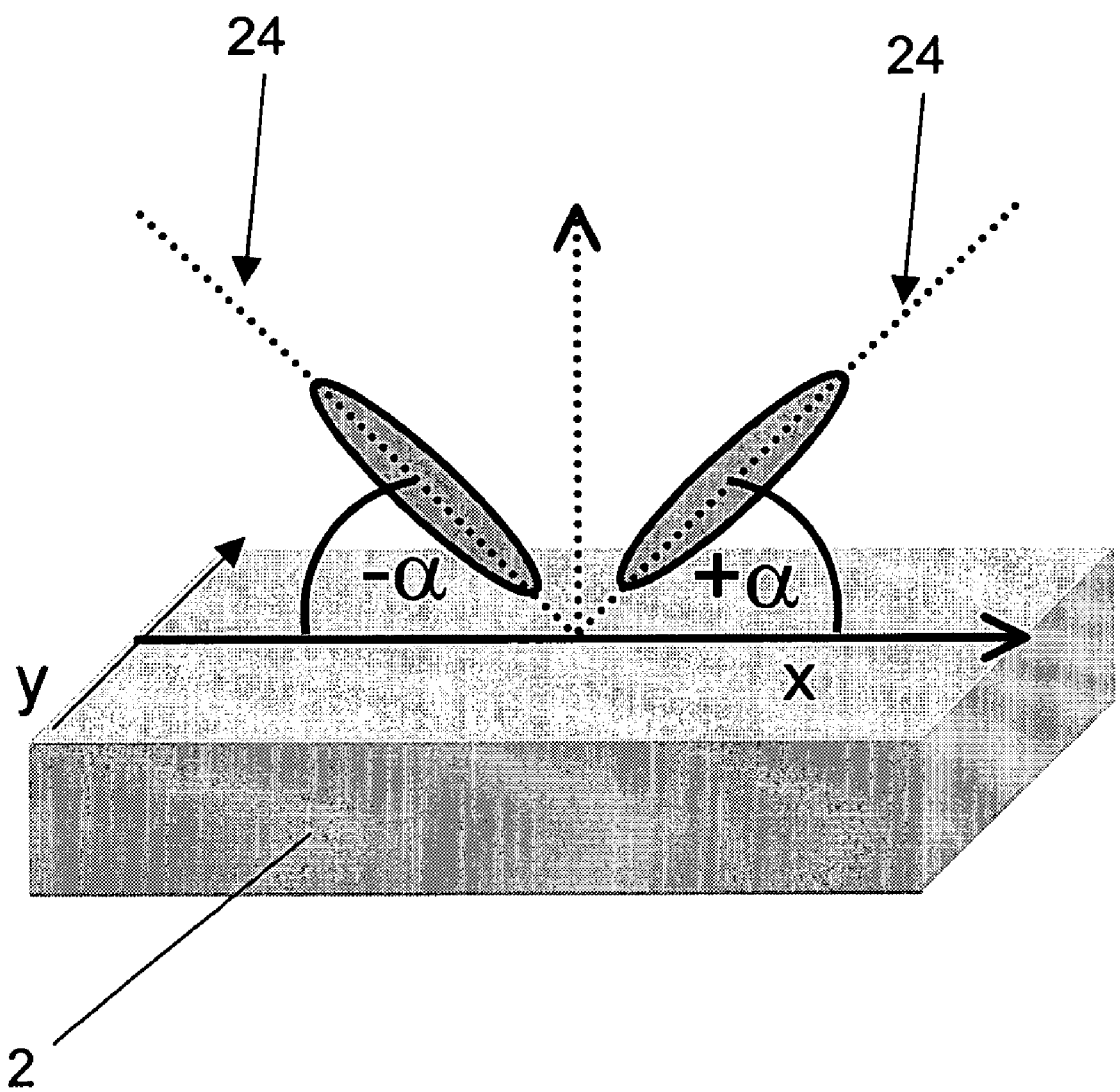
FIG. 30 illustrates two different tilt angle polarities for an LC director in a single azimuthal direction.

Some examples of masks for making different teardrop-shaped alignment posts are illustrated in the SEMs shown in FIG. 25. We expect that any cross-sectional shape that has the same symmetry properties as the teardrop will have the same properties of being able to give good alignment to the LC without the post or hole having to be tilted. Some non-limiting example shapes are illustrated in FIG. 29.

Figure 21:
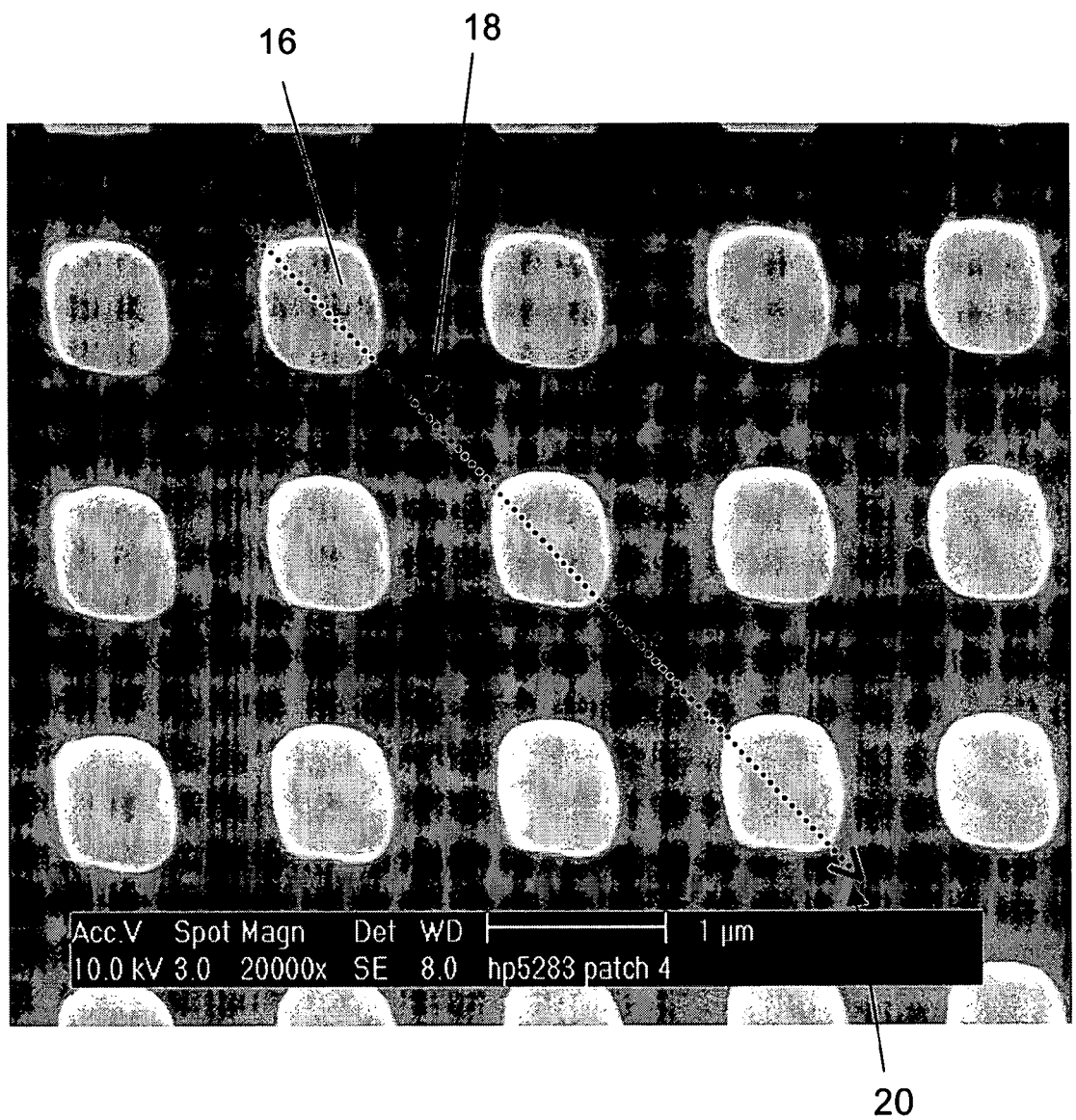
FIG. 21 shows LC alignment for an array of posts in a display in accordance with the invention.

For all of the posts and holes which we have made to date having the specified shape with no plane of symmetry orthogonal to the azimuthal plane and to the plane of the cell wall surfaces, we have found that the LC aligns along the longest direction. The SEM of FIG. 21 shows a particular case, with the LC aligning along the direction indicated by the dotted line 18. The LC tilts out of the page, as indicated by the arrow 20. On average the LC tilts from the tail of the arrow towards the arrow head, with the arrow head being higher above the substrate than the tail.

Figure 23:
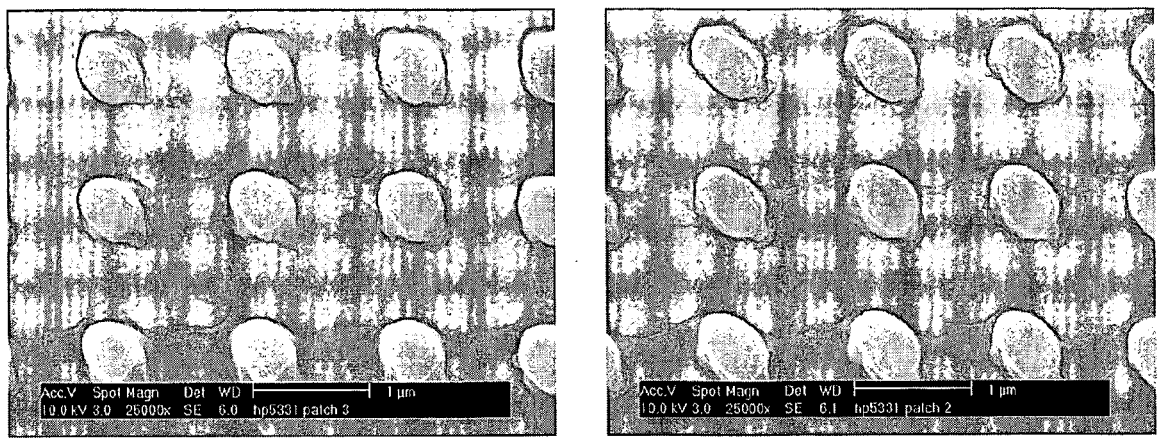

Suitable teardrop alignment posts may be formed by embossing a plastics material. Arrays of such posts are shown in FIGS. 20, 21 and 23. Suitable imprinting or embossing processes are well known per se, for example as disclosed in *Unconventional Methods for Fabricating and Patterning Nanostructures*, Youan Xia et al, Chem. Rev. 1999, 99, 1823-

1848, Soft Lithography, Youan Xia and George M. Whitesides, *Agnew. Chem. Int. Ed.* 1998, 37, 550-575, U.S. Pat. Nos. 6,671,059, 4,294,782, 4,758,296, 4,906,315, the contents of each of which are incorporated herein in their entirety. The basic process is:

a) Make a copy of the master to form a stamp—this has the inverse of the microstructure on the master. The stamp can be formed from elastomers, polymers or even metal.
b) The stamp is then imprinted into a polymer layer on the display substrate. Thermal imprinting can be used to imprint into a thermoplastic or, more commonly, a liquid UV-curable polymer. In the latter case, the liquid makes contact with the stamp, takes up the shape of the microstructure relief and is then cured by exposure to UV light. The stamp is then separated from the substrate, leaving behind a copy of the original master.

Figure 27:
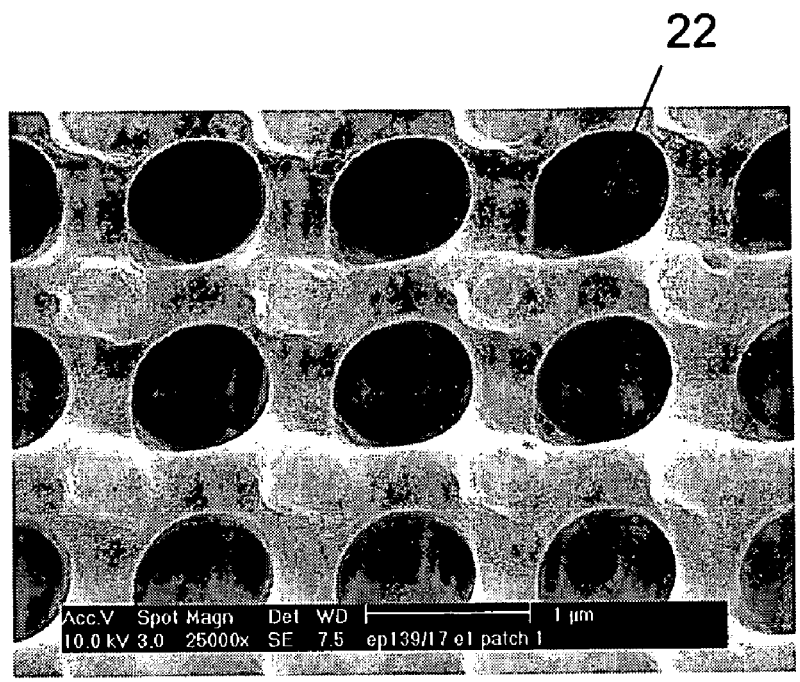
FIGS. 27 and 28 are SEM photomicrographs showing arrays of holes formed from a plastics material, in accordance with further aspects of the invention.
Figure 28:
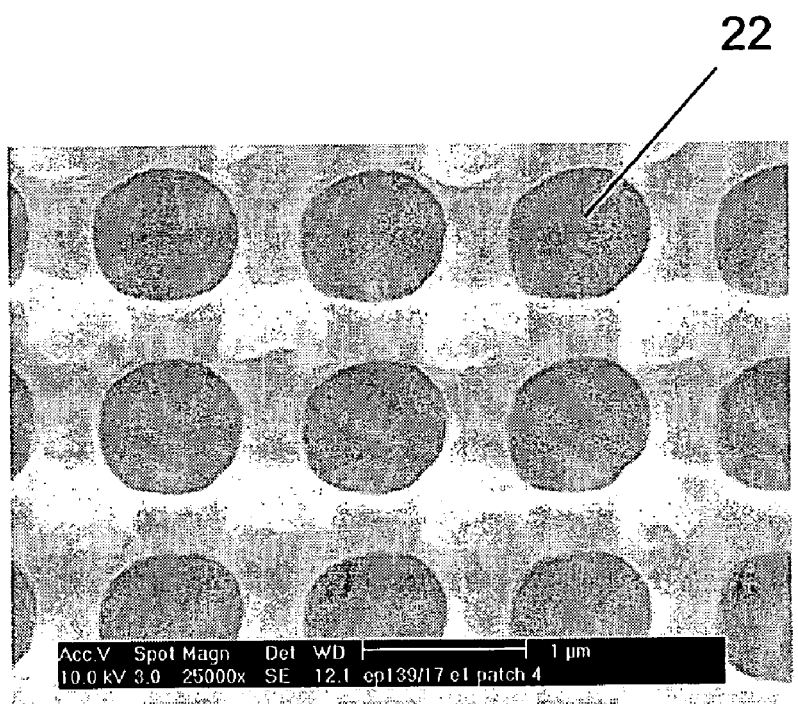

A similar process is used to make alignment holes.

a) Start with a post master.
b) Make a stamp.
c) Then make a second generation stamp, effectively using the first stamp as a master. This second generation stamp has the same sense of microstructure as the original master—ie, posts. When this is imprinted into the UV-curable material the resulting microstructure will be the inverse of the master—ie, holes 22. Some examples of alignment holes 22 which are suitable for use in the invention are shown in the SEM photomicrographs of FIGS. 27 and 28, formed by imprinting. Bistable displays have been formed using either posts or holes having the specified shape.

Figure 24:
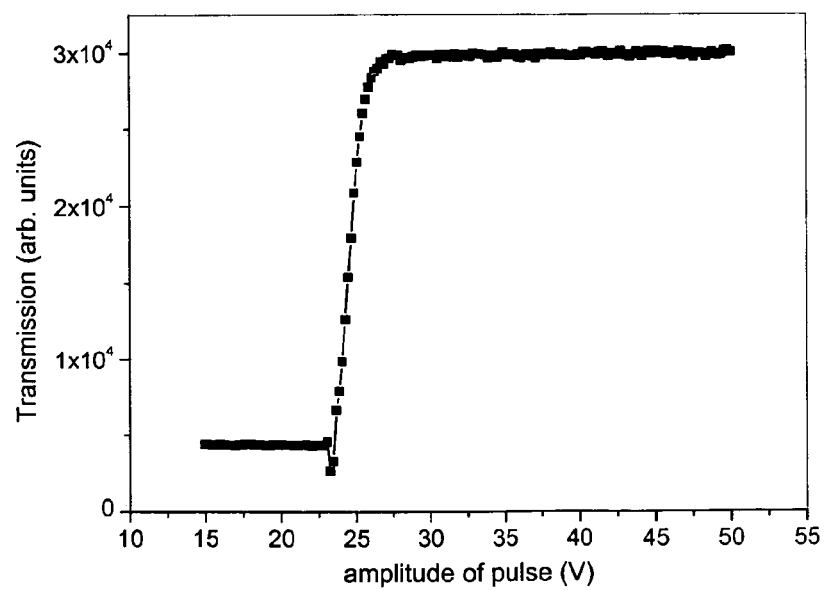
FIG. 24 is a graph of light transmission against pulse amplitude for a liquid crystal display device in accordance with an embodiment of the invention.
Figure 26:
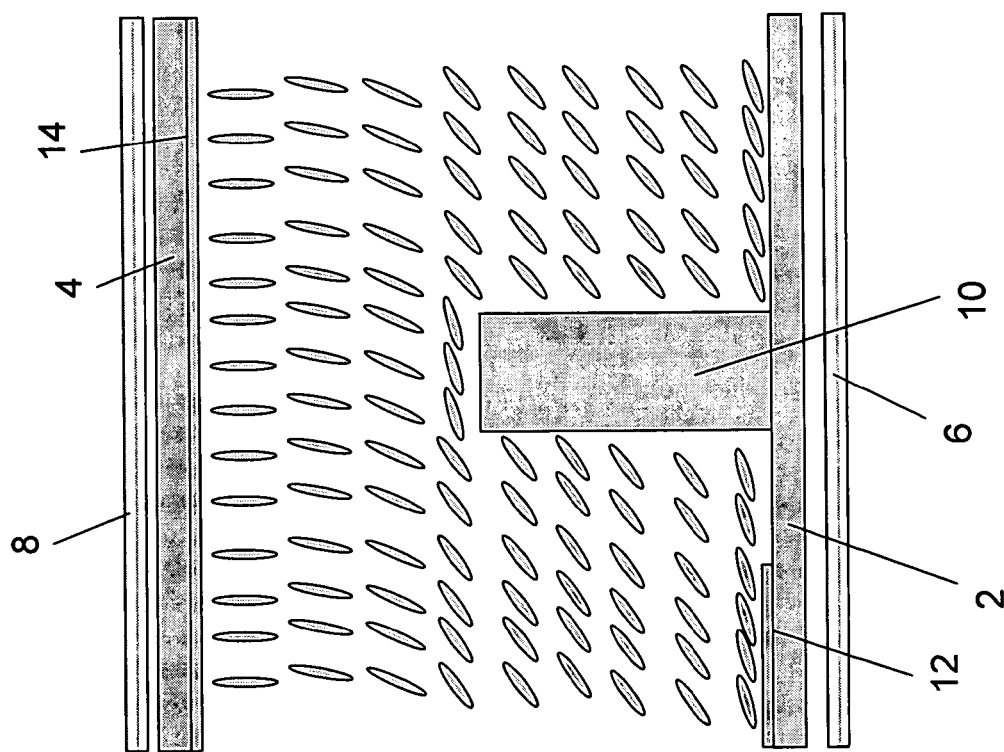
FIG. 26 shows schematic views of a cross section through a single post and the surrounding LC of a bistable nematic device in accordance with an aspect of the invention, along one of the diagonals of a post, in different states.
Figure 26:
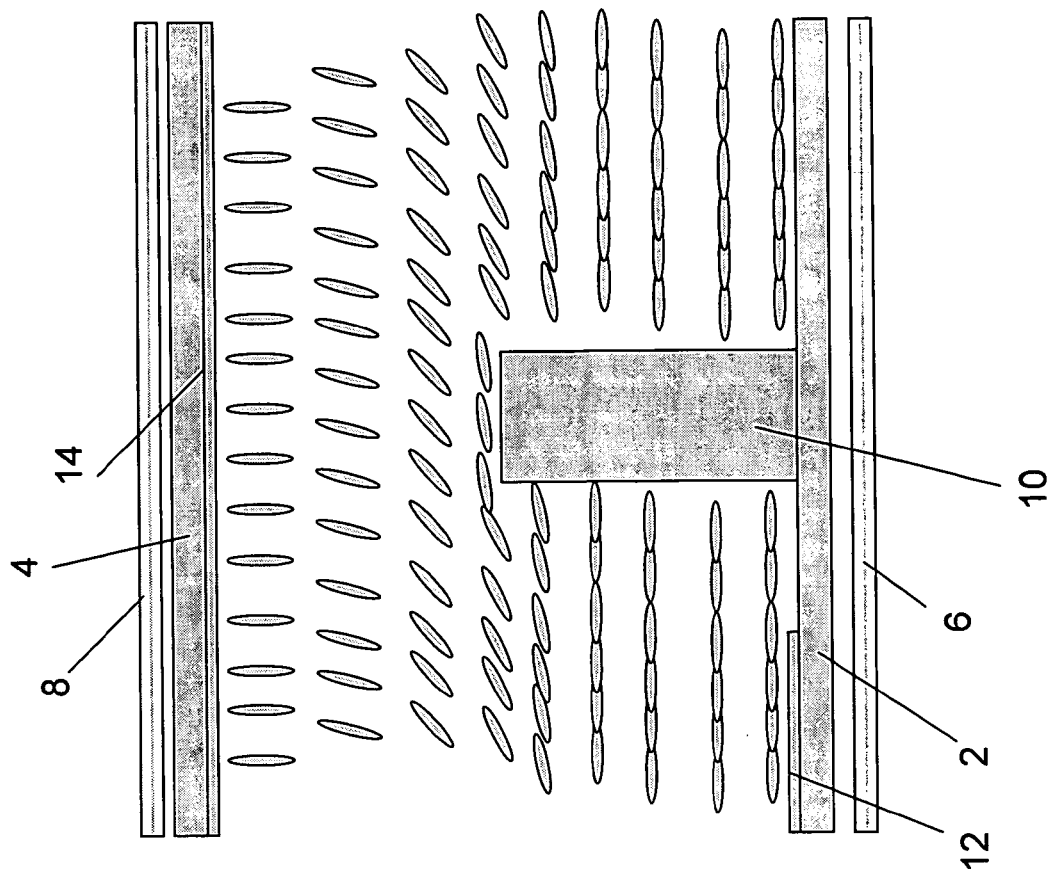

The two bistable alignment states for the orthogonal teardrop alignment posts 10 are illustrated schematically in FIG. 26. Switching results are shown in FIG. 24. The testing method was as follows:

a) Apply a reset pulse to set the device into one of the states—in this case the dark state.
b) Apply a test pulse. In this set of results the length of the pulse is fixed and we are just varying the amplitude. In all cases the test pulse is a symmetric bipolar square wave pulse with a total duration of 0.8 ms.
c) Wait until any transients have settled down to ensure that we are measuring the transmission of a stable state, with no voltage applied. Typically we wait for 1 second.
d) Measure the light transmission.
e) Go back to the first step and repeat, increasing the amplitude of the pulse each time.

At a high enough voltage the device latches into the light state, which is stable after the voltage is removed.

The articles "a" and "an" when used herein denote "at least one" where the context permits.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the spirit and scope of the present invention.

What is claimed is:

1. A liquid crystal device comprising a first cell wall and a second cell wall enclosing a layer of liquid crystal material; electrodes for applying an electric field across at least some of the liquid crystal material; and
a surface alignment structure on a region of a substantially planar inner surface of at least the first cell wall, the alignment structure inducing the liquid crystal material in said region to adopt a desired alignment in an azimuthal plane,
wherein said surface alignment structure comprises a two dimensional array of microstructures which are shaped and oriented to produce the desired alignment, each microstructure extending to a distance of at least about 150 nm normal to said planar inner surface and having no plane of symmetry orthogonal to said azimuthal plane and to said planar inner surface; but not including any device in which the surface alignment structure comprises a sinusoidal bigrating.

2. A device according to claim 1, wherein each microstructure is defined by walls which extend substantially orthogonally to said planar inner surface.

3. A device according to claim 1, wherein each microstructure has a cross sectional shape in a plane parallel to said planar inner surface, said cross sectional shape having no rotational symmetry.

4. A device according to claim 3, wherein said cross sectional shape has a unique long axis.

5. A device according to claim 4, wherein said cross sectional shape has a line of symmetry including said long axis.

6. A device according to claim 1, wherein the shape and orientation of the microstructures is such as to induce the liquid crystal director adjacent said microstructures to adopt two different tilt angles in the same azimuthal plane; the arrangement being such that two stable liquid crystal molecular configurations can exist after suitable electrical signals have been applied to said electrodes.

7. device according to claim 1, wherein the microstructures are formed from a photoresist or a plastics material.

8. A device according to claim 1, wherein each microstructure extends to a distance in the range about 200 nm to about 5 μm normal to said planar inner surface.

9. A device according to claim 1, wherein each microstructure extends to a distance in the range about 500 nm to about 5 μm normal to said planar inner surface.

10. A device according to claim 1, wherein each microstructure extends to a distance in the range about 1 μm to about 5 μm normal to said planar inner surface.

11. A device according to claim 1, wherein each microstructure has at least one wall which is tilted with respect to said planar inner surface.

12. A device according to claim 1, wherein the microstructures are posts.

13. A device according to claim 12, wherein each post extends substantially orthogonally to said planar inner surface and has a free end surface which is substantially planar and substantially parallel to said planar inner surface.

14. A device according to claim 12, wherein said posts are at least one of different height, different shape, and different orientation in different regions of the device.

15. A device according to claim 1, wherein each microstructure has a width in the range about 0.2 μm to about 3 μm.

16. A device according to claim 1, wherein the microstructures are spaced from about 0.1 μm to about 5 μm apart from each other.

17. A device according to claim 1, wherein the microstructures are holes in a layer of a material.

18. A device according to claim 17, wherein each hole extends substantially orthogonally to said planar inner surface and has a bottom surface which is substantially planar and substantially parallel to said planar inner surface.

19. A device according to claim 17, wherein said holes are at least one of different depth, different shape, and different orientation in different regions of the device.

20. A device according to claim 17, wherein said material is a photoresist or plastics material.

21. A device according to claim 1, wherein said microstructures are not treated with or formed from a material which induces local homeotropic alignment of said liquid crystal material.

22. A liquid crystal device comprising a first cell wall and a second cell wall enclosing a layer of liquid crystal material;
   electrodes for applying an electric field across at least some of the liquid crystal material; and
   a surface alignment structure on a region of a substantially planar inner surface of at least the first cell wall, the alignment structure inducing the liquid crystal material in said region to adopt a desired alignment in an azimuthal plane,
   wherein said surface alignment structure comprises a two dimensional array of upstanding posts formed from a photoresist or a plastics material and which are shaped and oriented to produce the desired alignment;
   each post extending substantially orthogonally to said planar inner surface and having a free end surface which is substantially planar and substantially parallel to said planar inner surface, the free end surface having a shape which has no plane of symmetry orthogonal to said azimuthal plane and to said planar inner surface.

23. A device according to claim 22, wherein said end surface shape has a unique long axis.

24. A device according to claim 23, wherein said end surface shape has a line of symmetry including said long axis.

25. A liquid crystal device comprising a first cell wall and a second cell wall enclosing a layer of liquid crystal material;
   electrodes for applying an electric field across at least some of the liquid crystal material; and
   a surface alignment structure on a region of a substantially planar inner surface of at least the first cell wall, the alignment structure inducing the liquid crystal material in said region to adopt a desired alignment in an azimuthal plane,
   wherein said surface alignment structure comprises a two dimensional array of blind holes formed in a layer of a photoresist or a plastics material and which are shaped and oriented to produce the desired alignment; each hole extending substantially orthogonally to said planar inner surface and having a blinding surface which is substantially planar and substantially parallel to said planar inner surface, said blinding surface and having a shape which has no plane of symmetry orthogonal to said azimuthal plane and to said planar inner surface.

26. A liquid crystal device comprising a first cell wall and a second cell wall enclosing a layer of liquid crystal material;
   electrodes for applying an electric field across at least some of the liquid crystal material; and
   a surface alignment structure on a region of a substantially planar inner surface of at least the first cell wall, the alignment structure inducing the liquid crystal material in said region to adopt a desired alignment in an azimuthal plane,
   wherein said surface alignment structure comprises a two dimensional array of microstructures which are shaped and oriented to produce the desired alignment; each microstructure being substantially cylindrical or truncated conical and extending to a distance in the range about 150 nm to about 5 μm normal to said planar inner surface, said cylinder or cone having a base shape which has no plane of symmetry orthogonal to said azimuthal plane and to said planar inner surface; but not including any device in which the surface alignment structure comprises a sinusoidal bigrating.

27. A bistable liquid crystal device comprising a first cell wall and a second cell wall enclosing a layer of liquid crystal material;
   electrodes for applying an electric field across at least some of the liquid crystal material; and
   a surface alignment structure on a region of a substantially planar inner surface of at least the first cell wall, the surface alignment structure providing an alignment to the liquid crystal molecules,
   wherein said surface alignment structure comprises a two dimensional array of microstructures which are shaped and oriented to induce the liquid crystal director adjacent said microstructures to adopt two different tilt angles in the same azimuthal plane;
   each microstructure extending to a distance in the range about 150 nm to about 5 μm normal to said planar inner surface and having a cross sectional shape which has no plane of symmetry orthogonal to said azimuthal plane and to said planar inner surface; said microstructures not being treated with or formed from a material which induces local homeotropic alignment of said liquid crystal material;
   the arrangement being such that two stable liquid crystal molecular configurations can exist after suitable electrical signals have been applied to said electrodes.

28. A cell wall for use in manufacturing a liquid crystal device, comprising a substrate having a substantially planar surface and an alignment structure on a region of said surface for inducing liquid crystal material in said region to adopt a desired alignment in an azimuthal plane,
   wherein said surface alignment structure comprises a two dimensional array of microstructures which are shaped and oriented to produce the desired alignment;
   each microstructure extending to a distance in the range about 150 nm to about 5 μm normal to said planar inner surface and having no plane of symmetry orthogonal to said azimuthal plane and to said planar inner surface; but not including any cell wall in which the surface alignment structure comprises a sinusoidal bigrating.

* * * * *

UNITED STATES PATENT AND TRADEMARK OFFICE
CERTIFICATE OF CORRECTION

PATENT NO. : 7,460,200 B2
APPLICATION NO. : 11/133672
DATED : December 2, 2008
INVENTOR(S) : Stephen Christopher Kitson et al.

Page 1 of 1

It is certified that error appears in the above-identified patent and that said Letters Patent is hereby corrected as shown below:

On the title page, item (73), in "Assignee", in column 1, line 1, delete "Helwett" and insert -- Hewlett --, therefor.

In column 14, line 31, in Claim 7, insert -- A -- before "device".

Signed and Sealed this

Twenty-sixth Day of May, 2009

JOHN DOLL
*Acting Director of the United States Patent and Trademark Office*